United States Patent [19]
Arinobu et al.

[11] Patent Number: 5,225,994
[45] Date of Patent: Jul. 6, 1993

[54] CONTROL AND SUPERVISORY SYSTEM FOR POWER DISTRIBUTION EQUIPMENT

[75] Inventors: Ichiro Arinobu; Hirohisa Mizuhara; Yasuhiro Ishii; Katsuya Sakai; Hiromitsu Takahashi, all of Fukuyama, Japan

[73] Assignee: Mitsubishi Denki Kabushiki Kaisha, Tokyo, Japan

[21] Appl. No.: 489,255

[22] Filed: Mar. 6, 1990

[51] Int. Cl.$^5$ .............................................. G06F 15/20
[52] U.S. Cl. .............................. 364/492; 340/825.07; 307/39
[58] Field of Search ............... 364/492, 132, 138, 187, 364/481, 483, 143; 340/825.06, 825.07, 825.37, 825.49; 307/39, 35

[56] References Cited

U.S. PATENT DOCUMENTS

| | | | |
|---|---|---|---|
| 4,352,992 | 10/1982 | Buennagel | 340/825.06 |
| 4,686,630 | 8/1987 | Marsland et al. | 364/492 |
| 4,777,607 | 10/1988 | Maury et al. | 364/492 |
| 4,964,058 | 10/1990 | Brown, Jr. | 364/492 |
| 4,977,515 | 12/1990 | Rudden et al. | 364/492 |

FOREIGN PATENT DOCUMENTS

| | | |
|---|---|---|
| 0062870 | 4/1982 | European Pat. Off. |
| 0265342 | 10/1987 | European Pat. Off. |
| 56-25887 | 3/1981 | Japan |
| 8101350 | 5/1981 | PCT Int'l Appl. |
| 8912345 | 12/1989 | PCT Int'l Appl. |

OTHER PUBLICATIONS

Klünder et al., "ISH '89: Gebäudeleitsysteme im Aufwärtstrend" ATP Automatisierungstechnische Praxis 31 (Oct. 1989) No. 10 pp. 482-489.

Primary Examiner—Thomas G. Black
Assistant Examiner—Ellis B. Ramirez
Attorney, Agent, or Firm—Leydig, Voit & Mayer

[57] ABSTRACT

A novel and improved control and supervisory system for power distribution equipment including a plurality of terminal control and/or supervisory devices each capable of controlling and/or supervising a plurality of power distribution devices in an extremely simple, high-speed and efficient manner without requiring any central control and/or supervisory unit. To such control and/or supervisory operation, no vast and full knowledge of permitted and inhibited operations of varying kinds of power distribution devices connected therewith, as well as of the control and supervisory procedures therefor, is required. To these ends, each of the terminal control devices comprises a control and/or supervisory instruction section operable to output a control or supervisory command for controlling or supervising a plurality of power distribution devices, and a control and/or supervisory section operable to receive the control or supervisory command from the control and/or supervisory instruction section for generating a control or supervisory signal suited to control or supervise a corresponding one of the power distribution devices, and outputting it to the corresponding power distribution device. In one embodiment, the control or supervisory command is conceptually common to the power distribution devices. In another embodiment, the control and supervisory command is intrinsic to a corresponding one of the power distribution devices. Thus, there is no need for a sender terminal device to prepare specific control and supervisory programs suited to the respective power distribution devices.

16 Claims, 22 Drawing Sheets

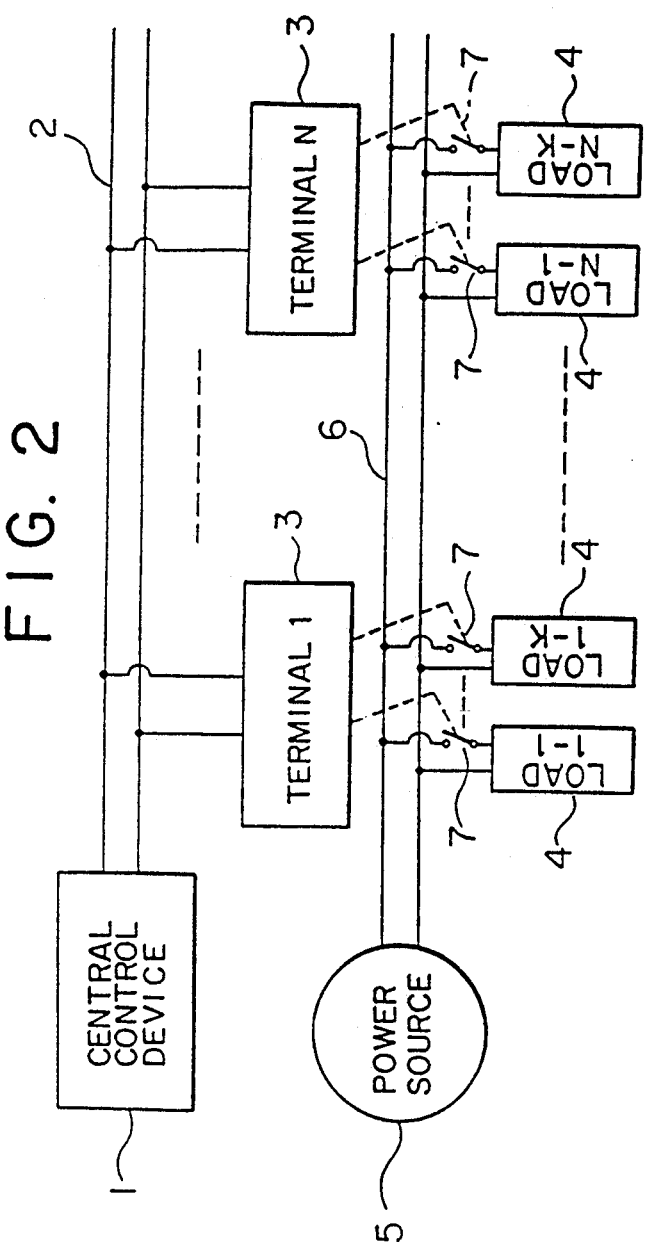
FIG. 2
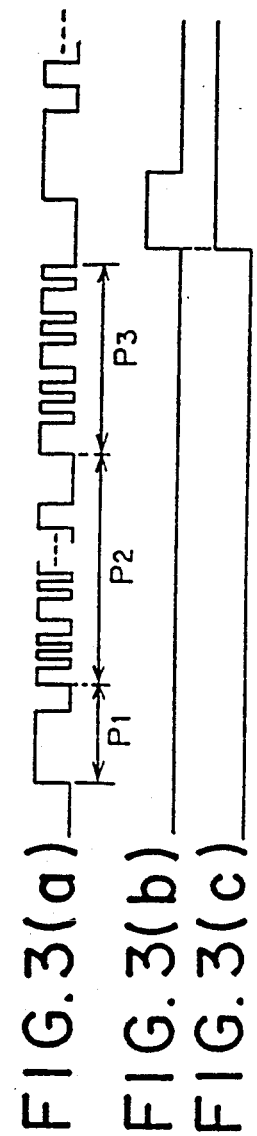
FIG.3(a)
FIG.3(b)
FIG.3(c)

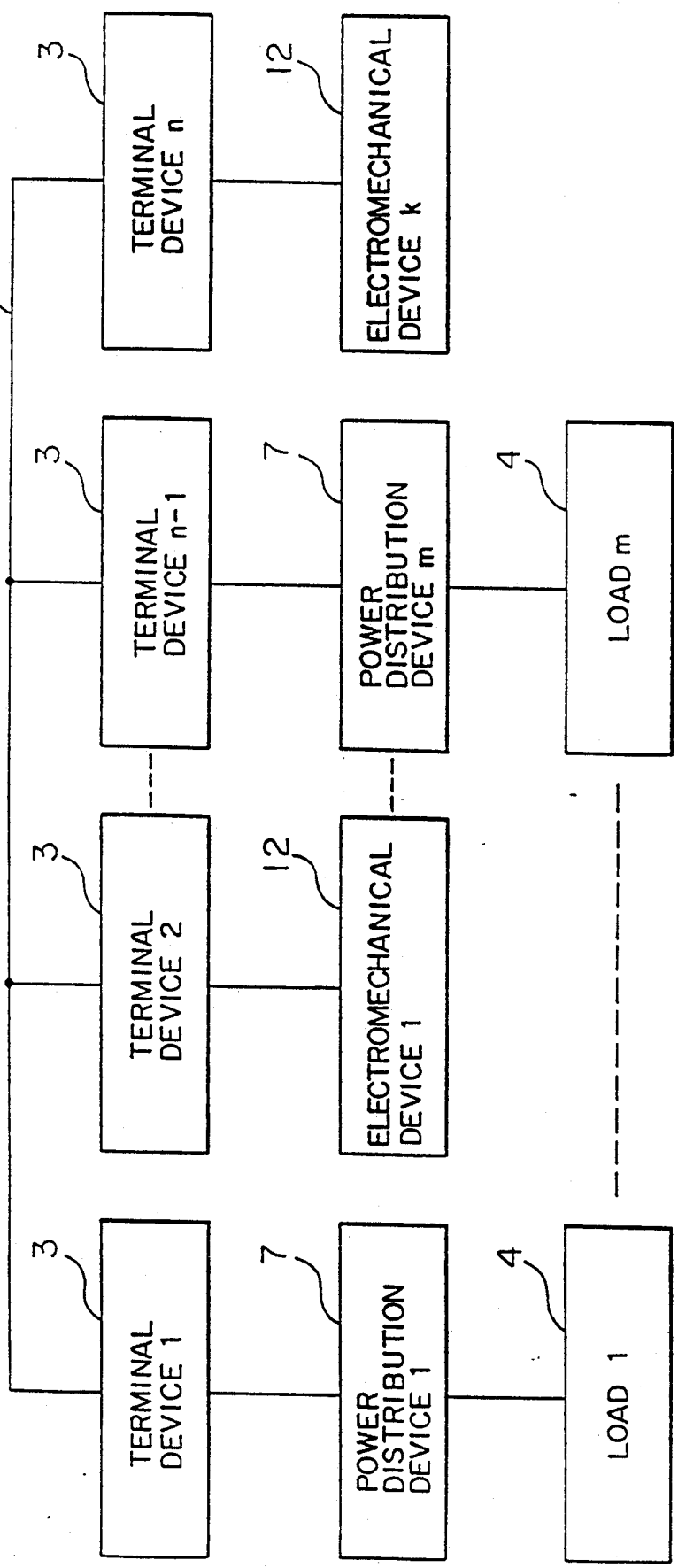

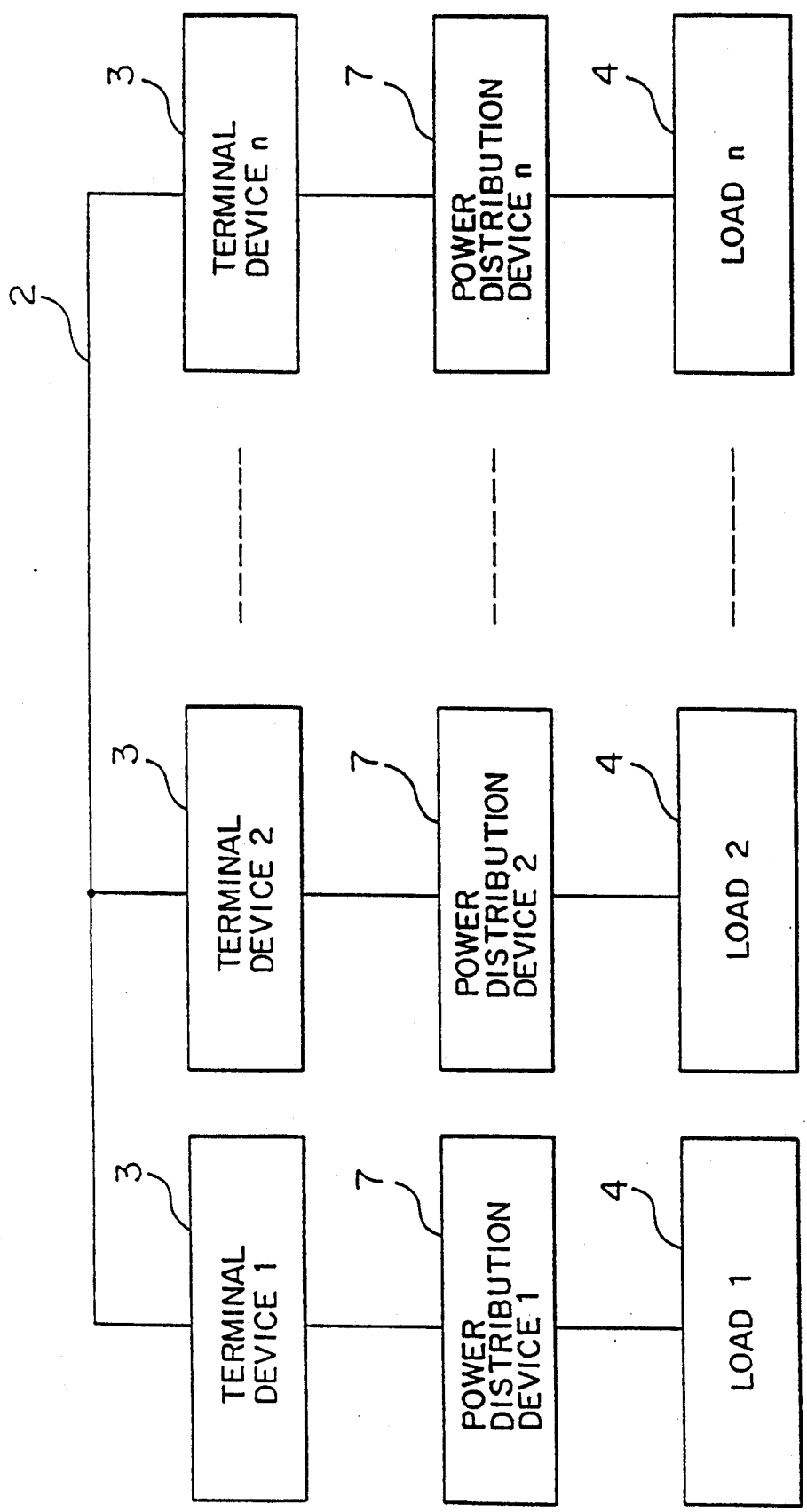

FRAME STRUCTURE
- SA : SELF ADDRESS
- DA : DISTANT ADDRESS
- CW : INSTRUCTION & ALARM COMMAND
- BC : NUMBER OF DATA (o~n)
- DT : COMMAND DATA
- FCC: FRAME CHECK CODE ("ON" OR "NV-ON" COMMAND)

FIG. 13
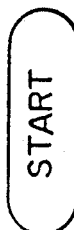
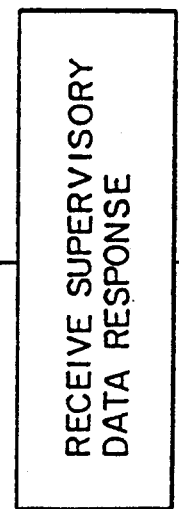
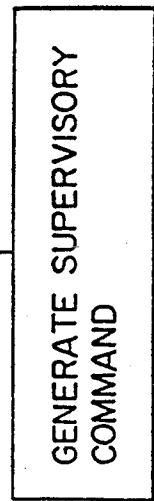

FIG. 14

EXAMPLE OF GENERATION OF SUPERVISORY INFORMATION FOR EARTH-LEAKAGE BREAKER

| SUPERVISORY INFORMATION | INPUT INFORMATION | AUXILIARY CONTACT AX | ALARM CONTACT AL | EARTH-LEAKAGE ALARM CONTACT EAL |
|---|---|---|---|---|
| NORMAL OPERATION | BREAKER OFF | OPEN | OPEN | OPEN |
| | BREAKER ON | CLOSED | OPEN | OPEN |
| | OVERCURRENT & SHORTCIRCUIT TRIPPED CONDITION | OPEN | CLOSED | OPEN |
| | EARTH-LEAKAGE TRIPPED CONDITION | OPEN | CLOSED | CLOSED |
| ABNORMAL OPERATION | OVERCURRENT & SHORTCIRCUIT TRIP MALFUNCTION | CLOSED | CLOSED | OPEN |
| | EARTH-LEAKAGE TRIP MALFUNCTION | CLOSED | OPEN OR CLOSED | CLOSED |
| | OTHER MALFUNCTIONS | COMBINATIONS OTHER THAN THE ABOVE | | |

("OFF" OR "NV-OFF" COMMAND)

CONTROL AND SUPERVISORY SYSTEM FOR POWER DISTRIBUTION EQUIPMENT

BACKGROUND OF THE INVENTION

The present invention relates to a control and supervisory system for power distribution equipment, and more particularly, it relates to a control and supervisory system which is able to make up a network from respective pieces of supervisory and control information about various kinds of power distribution devices including protective equipment such as non-fusible circuit breakers, earth-leakage breakers, etc., electromagnetic switches for on-off control, remote-controlled equipment, and metering equipment such as transducers, watt-hour meters, etc.

Among these types of conventional control systems, a typical power distribution equipment control and supervisory system is diagrammatically shown in FIG. 1. The system illustrated generally includes a central control and supervisory unit (hereinafter referred to as a main device) 1 having a built-in microcomputer, and a plurality of terminal control and supervisory units (hereinafter referred to as terminal devices) 3 connected to the main device 1 through a signal transmission line 2 for controlling and supervising a plurality of power distribution devices 7 each of which controls, protects and supervises a corresponding electric load. Each of the terminal devices 3 receives a control signal transmitted from the main device 1 via the signal transmission line 2 and sends it out to the corresponding power distribution device 7, whereas a signal inputted from a power distribution device 7 to the corresponding terminal device 3 is returned to the main device 1 via the signal transmission line 2.

A more concrete example of the above mentioned control and supervisory system is illustrated in FIG. 2. The system illustrated is a load control apparatus for a power distribution system utilizing a private multiplex transmission as described in Japanese Patent Publication No. 59-29998. In FIG. 2, the load control apparatus includes a central control and supervisory device (i.e., a main device) 1, a plurality of terminal devices 3 each adapted to receive a control signal from the main device 1 through a signal transmission line 2, a multitude of electric loads 4, a commercial power source 5 for supplying power to the respective loads 4 through power lines 6, and a plurality of power distribution devices 7 in the form of on-off control switches provided one for each load 4 and adapted to be each operated by the control output of a corresponding terminal device 3 for controlling the power supply from the power source 5 to a corresponding electric load 4.

In this type of load control apparatus, a signal, which is shown in FIG. 3(a), is transmitted from the main device 1 to the terminal devices 4 through the signal transmission line 2. This type of control in the above load control apparatus is commonly performed in many other similar apparatuses which utilize private multiplex transmission. In FIG. 3(a), $P_1$ designates a start pulse indicative of the starting of a signal transmission; $P_2$ a terminal address pulse indicative of the addresses of the terminal devices 3; and $P_3$ a control pulse indicative of control signals inputted from the main device 1 to the terminal devices 3.

Each of the terminal devices 3 makes a comparison between its self terminal address stored therein and the terminal address pulse $P_2$ inputted thereto from the main device 1. If a particular terminal device 3 determines that they coincide with each other, then it generates an address-coincidence signal, as illustrated in FIG. 3(b), and a latch output, as illustrated in FIG. 3(c), whereby the corresponding control switch 7 is closed so as to supply power from the power source 5 to the corresponding electric load 4.

In this connection, it will be readily understood that in the case where the main device 1 is intended to perform supervisory operation, the above control procedure can also be utilized to realize the function of collecting information about the on/off conditions of switch signals which are inputted from the control switches 7 to the respective terminal devices 3.

A more concrete description will now be made of the case in which this type of control and supervisory system is applied to controlling and supervising an earth-leakage breaker equipped with an electrically operated device. FIG. 4 shows one example of such a system. In this figure, the system illustrated includes a main device 1 in the form of a central control and supervisory unit, a terminal device 3 adapted to be operated by a control and supervisory signal which is inputted thereto from the main device 1 through a signal transmission line 2, an electric load 4 in the form of an electric motor, a main circuit power source 5, a power line 6 for supplying power from the main power source 5 to the load 4, and a power distribution device 7 in the form of an earth-leakage breaker 7 connected between the main circuit power source 5 and the load 4. The earth-leakage breaker 7 includes a power terminal 7a, a switch 7b, a load terminal 7c, an overcurrent trip 7d, a ZCT 7e, and an earth-leakage trip 7f. The system also includes another terminal device 30 which has first through third LEDs 30-1, 30-2 and 30-3 operable in response to a control output of the terminal device 30 to indicate various operating conditions thereof such as, for example, an on-off condition, an overcurrent and shortcircuit trip condition, and an earth-leakage trip condition, a turn-on switch 30-4 in the form of a push button switch for performing a turn-on operation, and a turn-off switch 30-5 in the form of a push button switch for performing a turn-off operation, these switches being operated by an operator for supplying a supervisory input to the terminal device 30.

The system further includes an electrically operated device 8 associated with the earth-leakage breaker 7 in such a manner as to externally operate the switch 7b, an auxiliary contact 9 adapted to be operated to close or open in response to the operation of the switch 7b, an alarm contact 10 operable to generate an output based on the output of the overcurrent trip 7d, and an earth-leakage alarm contact 11 operable to generate an output based on the operation of the earth-leakage trip 7f.

The electrically operated device 8 is operated by an external switch comprising an on-driving control contact 3-1 and an off-driving control contact 3-2 for externally operating the earth-leakage breaker 7 and a circuit breaker. The device 8 is generally constructed such that it can operate a manipulation member in the form of a knob, lever, arm, etc., of the earth-leakage breaker 7 and/or the circuit breaker from the outside. A concrete example of such an electrically operated device 8 is illustrated in FIG. 5. In this figure, the electrically operated device 8 comprises a first and a second diode-bridge circuits 8a and 8c, each including a varistor for absorbing surge; a turn-on coil 8b which is operated by a DC current; a turn-off coil 8d which is operated by a DC current; and a connection terminal 8e having an earth terminal. The device 8 further includes an externally-operated turn-on switch 12, an externally-operated turn-off switch 13, and an auxiliary power source 14 for supplying power to the electrically operated device 8.

The operation of the above mentioned system for controlling and supervising the above earth-leakage breaker 7 by means of the main device 1 in a conventional manner will be described with particular reference to FIG. 4.

First, the main device 1 reads supervisory data from a supervisory input to the terminal device 30 through an appropriate means such as polling, and checks whether the turn-on switch 30-4 is pushed by an operator. If the answer is "NO", the main device 1 does nothing based on the data from the terminal device 30 and goes to another program and executes it. On the other hand, let us consider the case in which the turn-on switch 30-4 is pushed. In this case, if the main device 1 recognizes from the supervisory data response of the terminal device 30 that the turn-on switch 30-4 is pushed, then it starts to execute a program for controlling the earth-leakage breaker 7 in such a manner that the breaker 7 is turned on through the action of the terminal device 3. Here, the case in which the main device 1 operates to turn on the earth-leakage breaker 7 will be described in more detail while referring to FIG. 6 which shows a flow chart of a control procedure therefor.

First, in order to close the on-driving control output contact 3-1 of the terminal device 3 which constitutes the turn-on switch 12 in FIG. 5, the main device 1 outputs a control command in the form of an on-signal output to the terminal device 3 via the signal transmission line 2. Upon receipt of the control command from the main device 1, the terminal device 3 outputs it as an on-driving signal to thereby close the on-driving control contact 3-1. When the contact 3-1 has been fully closed, the terminal device 3 communicates a signal indicative of the closure of the contact 3-1 to the main device 1.

Subsequently, in order to determine whether the earth-leakage breaker 7 is operated in the normal manner by means of the on-driving output of the terminal device 3, the main device 1 sends to the terminal device 3 a supervisory command in the form of a supervisory data read-in command for reading the supervisory data about the earth-leakage breaker 7. Upon receipt of the supervisory command, the terminal device 3 reads, through lines 3-3, 3-4 and 3-5, the contact-input supervisory data (i.e., on/off signals from the AX, AL and EAL contacts 9, 10 and 11), as illustrated in FIG. 4, and sends it to the main device 1 via the signal transmission line 2.

Thereafter, the main device 1 operates to check, based on the supervisory data, whether or not the earth-leakage breaker 7 is performing the turn-on operation in the normal fashion. In other words, the main device 1 checks the contact signal AX which is inputted from the auxiliary contact 9 to the terminal device 3 through the lines 5. If it is determined that the earth-leakage breaker 7 is operating in the normal fashion, the main device 1 sends to the terminal device 3 a turn-on signal release command for terminating the on-driving output of the control output contact 3-1, so that the terminal device 3 is operated to open the turn-on switch 12 of FIG. 5 and terminate the on-driving output. After the termination of the on-driving output, the terminal device 3 communicates the termination to the main device 1 so that the main device 1 finishes the on-driving operation of the earth-leakage breaker 7.

Subsequent to the termination of the turn-on operation, in order to operate the turn-on indicating LED 30-1 of the terminal device 30, the main device 1 operates the terminal device 30 so as to light the LED 30-1 according to the same procedure as described above.

On the other hand, if it is determined that the operation of the earth-leakage breaker 7 is abnormal, an error processing is performed in accordance with a prescribed procedure, and then the main device 1 sends to the terminal device 3 an on-signal release command for terminating the on-signal output, whereby the terminal device 3 is operated to terminate the on-driving output. After the finishing of the on-driving output terminating operation, the terminal device 3 communicates the finishing of the terminating operation to the main device 1.

Thereafter, the main device 1 communicates the abnormal operation of the earth-leakage breaker 7 to the terminal device 30 which then performs its own error processing (e.g., lights an appropriate LED for indicating such an abnormality and inhibits a supervisory input to the terminal device 30) and finishes its operation.

As can be seen from the foregoing description, in the conventional control and supervisory system described above, the main device 1 has to send to the terminal device 3 a predetermined control procedure as required for the above control and supervisory operations so as to directly control the power distribution device 7 such as the earth-leakage breaker through the terminal device 3. Therefore, it is necessary for the main device 1 to prepare and store the required control and supervisory procedures.

With the conventional power distribution device control and supervisory system as described above, varying kinds of groups of power distribution devices are connected to form a kind of network. A minimum unit for controlling and supervising includes, by an output relay contact such as the on-driving or off-driving control output contact 3-1, 3-2 or by a contact input signal from the AX, AL or EAL contact, as shown in FIG. 4. Thus, the main device 1 is necessarily required to output a control or supervisory command in accordance with a predetermined algorithm which is defined by a specific control and supervisory procedure intrinsic to the respective power distribution devices. As a result, the control and supervisory procedures to be stored in the main device 1 become tremendous, increasing the processing time required for executing one control or supervisory command as well as resulting in a very low efficiency in utilization of transmission paths.

Further, in the above-described conventional system, the main device 1 is indispensable for organizing or arranging the entire system in order, and that is true in the even that a small or compact system is constructed. Therefore, in particular, the construction of a relatively small system is costly and requires a relatively large space for installation, Furthermore, engineers or programmers, who prepare control and supervisory procedures for the main device, have to be familiar with the procedures for permitted and inhibited operations of all the power distribution equipment to be connected with the main device so that algorithms to be prepared are accordingly increased in number and volume, and become much more complicated.

SUMMARY OF THE INVENTION

Accordingly, the present invention is intended to obviate the above mentioned problems of the prior art.

An object of the present invention is to provide a novel and improved control and supervisory system for power distribution equipment which does not require any central control and supervisory unit.

Another object of the present invention is to provide a novel and improved control and supervisory system for power distribution equipment which is able to control and/or supervise a plurality of power distribution devices in an extremely simple, high-speed and efficient manner without requiring any vast and full knowledge of permitted and inhibited operations of varying kinds of power distribution devices to be connected, as well as of the control and supervisory procedures therefore.

A further object of the present invention is to provide a novel and improved control and supervisory system for power distribution equipment which is able to eliminate the inconvenience and troublesomeness of preparing, at a sender terminal device, a specific control and supervisory program for each of a plurality of power distribution devices.

With the above objects in view, according to one aspect of the present invention, there is provided a control and supervisory system for power distribution equipment including a plurality of terminal control devices each controlling a corresponding power distribution device connected therewith, each of the terminal control devices comprising:

control instruction means operable to output a control command for controlling the plurality of power distribution devices, the control command being conceptually common to the power distribution devices; and control means operable to receive the control command from the control instruction means for generating a control signal suited to control a corresponding one of the power distribution devices, and outputting it to the corresponding power distribution device.

According to another aspect of the present invention, there is provided a control and supervisory system for power distribution equipment including a plurality of terminal control devices each supervising a corresponding power distribution device connected therewith, each of the terminal control devices comprising:

supervisory instruction means operable to output a supervisory command for supervising the plurality of power distribution devices, the supervisory command being conceptually common to the power distribution devices; and supervisory means operable to receive the supervisory command from the supervisory instruction means for generating a supervisory signal suited to supervise a corresponding one of the power distribution devices, and outputting it to the corresponding power distribution device.

According to a further aspect of the present invention, there is provided a control and supervisory system for power distribution equipment including a plurality of terminal control devices each controlling a corresponding power distribution device connected therewith, each of the terminal control devices comprising:

control instruction means operable to output a control command for controlling the plurality of power distribution devices, the control command being intrinsic to a corresponding one of the power distribution devices; and terminal control means operable to receive the control command from the control instruction means for generating a control signal suited to control a corresponding one of the power distribution devices, and outputting it to the corresponding power distribution device.

According to a yet further aspect of the present invention, there is provided a control and supervisory system for power distribution equipment including a plurality of terminal supervisory devices each supervising a corresponding power distribution device connected therewith comprising:

supervisory instruction means operable to output a supervisory command for supervising a plurality of power distribution devices, the supervisory command being intrinsic to a corresponding one of the power distribution devices and supervisory means operable to receive the supervisory command from the supervisory instruction means for generating a supervisory signal suited to supervise a corresponding one of the power distribution devices, and outputting it to the corresponding power distribution device.

The above and other objects, features and advantages of the present invention will become more readily apparent from the detailed description of a few presently preferred embodiments of the invention taken in conjunction with the accompanying drawings.

BRIEF DESCRIPTION OF THE DRAWINGS

FIG. 2 is a schematic view showing the general arrangement of a conventional control and supervisory system for power distribution equipment;

FIG. 3(a) is a timing chart of a signal which is transmitted from a main device to terminal devices of FIG. 2;

FIG. 3(b) is a timing chart of an address-coincidence signal which is generated by a terminal device of FIG. 2;

FIG. 3(c) is a timing chart of a latch output which is generated by a terminal device of FIG. 2;

FIG. 7(A) is a basic block diagram showing one example of the arrangement of a control and supervisory system for power distribution equipment according to the present invention;

FIG. 7(B) is a basic block diagram showing another example of the arrangement of a control and supervisory system for power distribution equipment according to the present invention;

FIG. 13 is a flow chart showing the operation of a supervisory instruction based on a supervisory command according to the present invention;

FIG. 14 is a table showing an example of supervisory information about an earth-leakage breaker generated according to the present invention;

DESCRIPTION OF THE PREFERRED EMBODIMENTS

Figure 1:
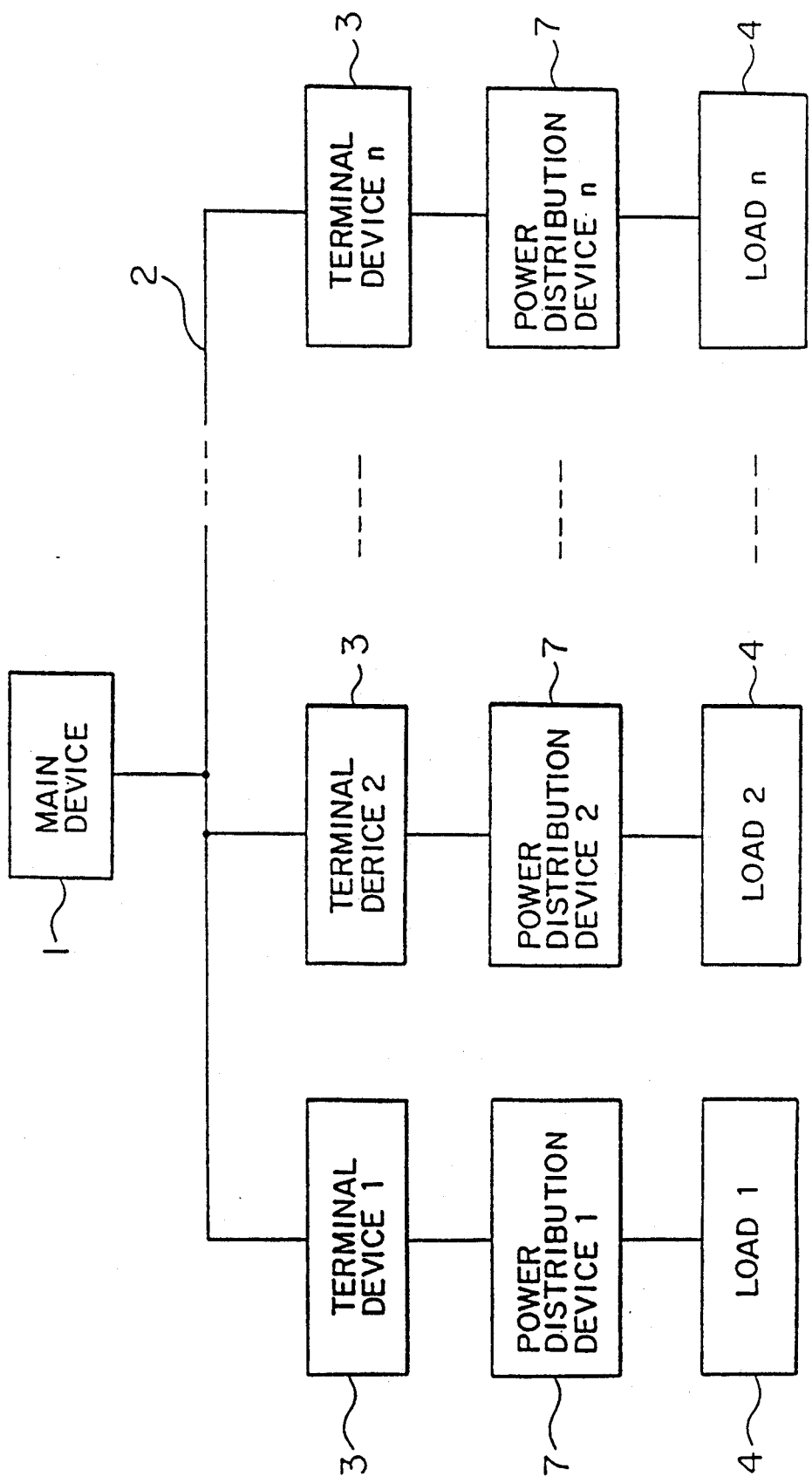
FIG. 1 is a basic block diagram of a conventional control and supervisory system for power distribution equipment.

The present invention will now be described in detail with reference to a few presently preferred embodiments thereof as illustrated in the accompanying drawings.

A control and supervisory system of the present invention generally does not include any main device or a central control and supervisory device for outputting a control or supervisory command to a plurality of terminal devices, as clearly shown in FIGS. 7(A) and 7(B) which schematically illustrate two different examples of the general arrangement of the system of the present invention. In FIG. 7(A), the control and supervisory system illustrated comprises a plurality of terminal control and supervisory devices 103 (hereinafter simply referred to as terminal devices) which are interconnected with each other through a signal transmission line 102 and each of which operates to generate and output a control or supervisory instruction to other terminal devices. Each of the terminal devices 103 is connected with at least one corresponding power distribution device 107 for controlling the power supply to at least one corresponding electric load 104, or with an electromechanical device 112 which controls and supervises at least one corresponding power distribution device 107. On the other hand, in FIG. 7(B), the system comprises a plurality of terminal devices 103 which are interconnected with each other through a signal transmission line 102 for generating and outputting a control or supervisory instruction to the other terminal devices 103. Each of the terminal devices 103 is connected with at least one corresponding power distribution device 107 which is in turn connected with at least one corresponding power distribution device 104.

Figure 4:
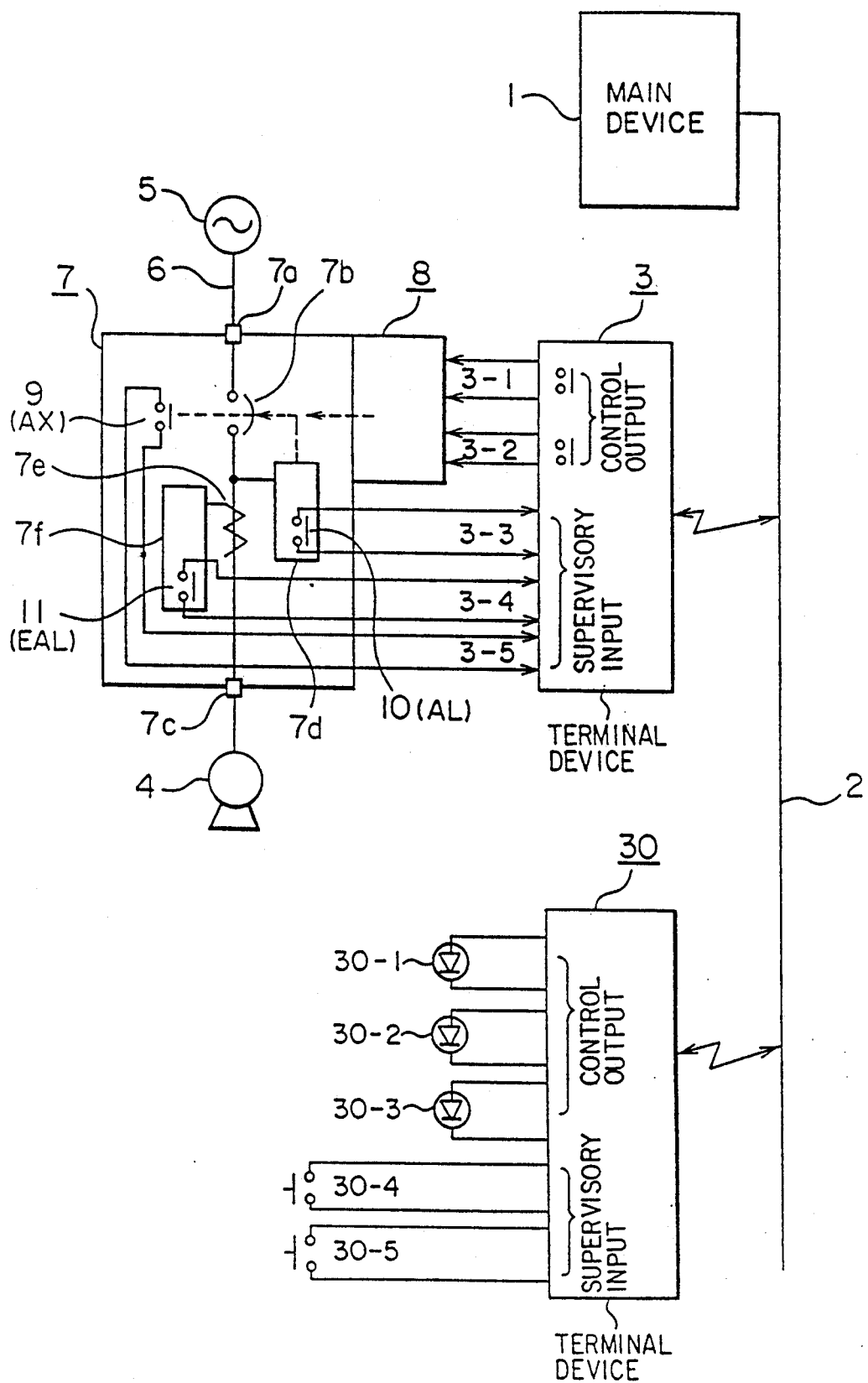
FIG. 4 is a circuit diagram showing a concrete example of the control and supervisory system of FIG. 1 in which a power distribution device in the form of an earth-leakage breaker is connected with a terminal device.

For the sake of simplicity in explanation, the case in which the control and supervisory system of the invention is applied for controlling and supervising the aforementioned conventional earth-leakage breaker of FIG. 4 will be described while referring to FIGS. 8 and 9.

Figure 8:
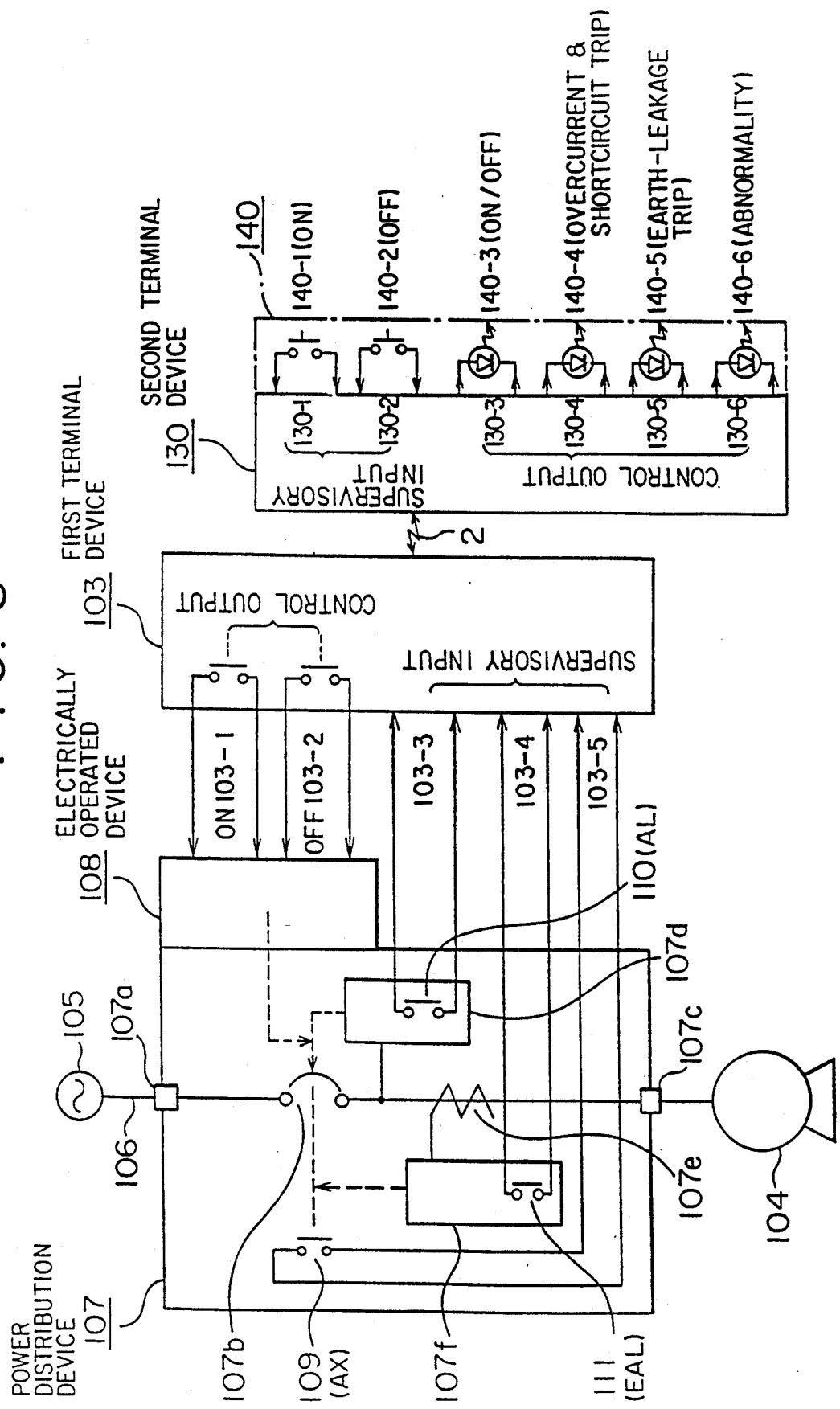
FIG. 8 is a block diagram showing a concrete arrangement of a control and supervisory system for power distribution equipment of the present invention, the system being applied for controlling and supervising an earth-leakage breaker.

In FIG. 8, the control and supervisory system illustrated includes a first terminal control and supervisory device 103 (hereinafter referred to as a first terminal device), a second terminal control and supervisory device 130 (hereinafter referred to as a second terminal device) connected with the first terminal device 103 through a signal transmission line 102, and a control and supervisory electromechanical device 140 (hereinafter referred to as an electromechanical device) connected with the second terminal device 130. The electromechanical device 140 includes a turn-on switch 140-1, a turn-off switch 140-2, a first indicator 140-3 for indicating an on/off condition, a second indicator 140-4 for indicating an overcurrent and shortcircuit tripped condition, a third indicator 140-5 for indicating an earth-leakage tripped condition, and a fourth indicator 140-6 for indicating an abnormal condition.

Figure 9:
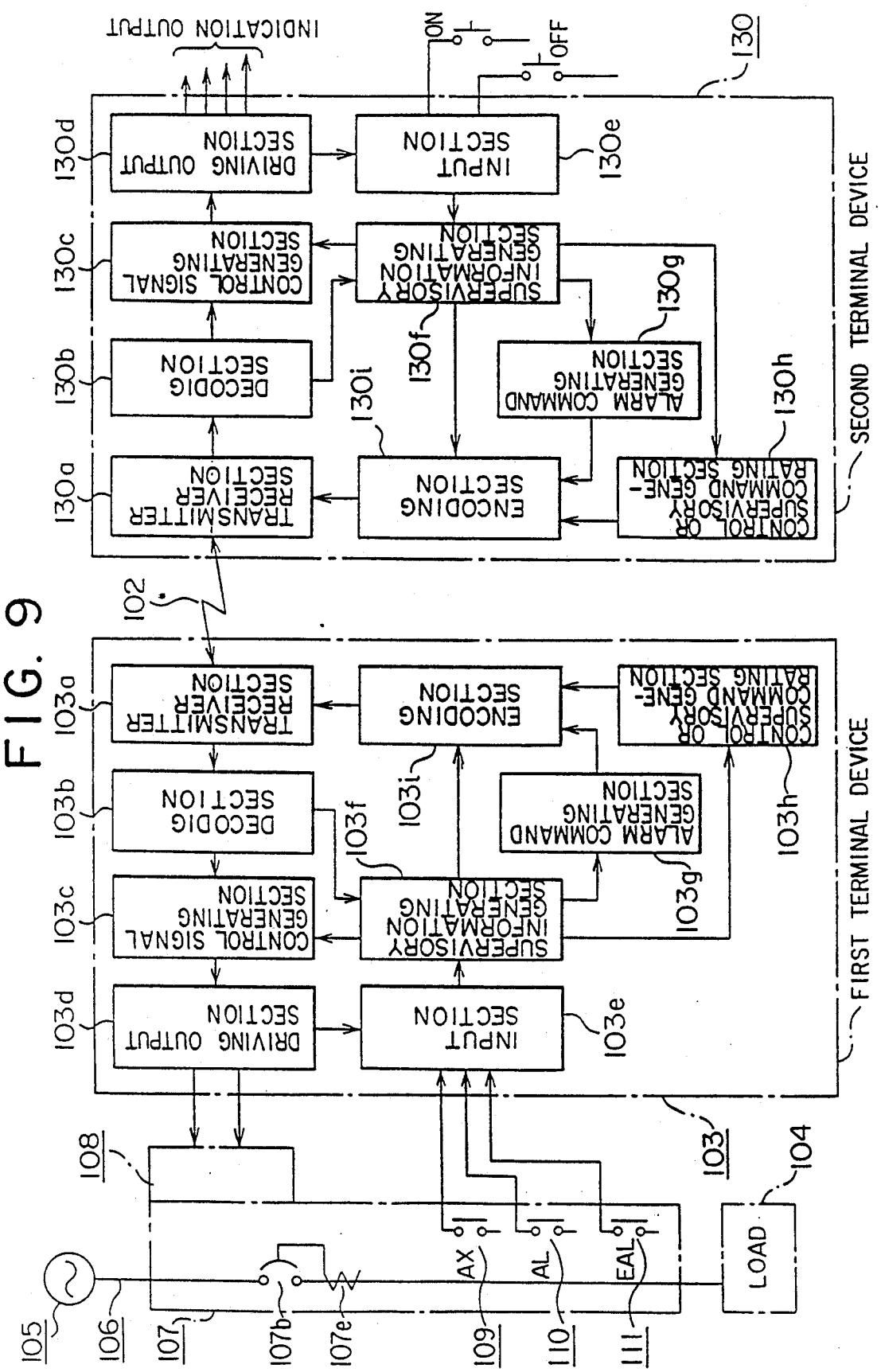
FIG. 9 is a basic functional block diagram of a control and supervisory system for power distribution equipment according to the present invention for the purpose of an explanation of FIG. 8.

As illustrated in FIG. 9, the first and second terminal devices 103 and 130 are substantially identical in construction with each other and operate to receive control or supervisory commands from other terminal devices for performing concrete control or supervisory operations on the power distribution devices connected therewith. Each of the first and second terminal devices 103, 130 comprises a transmitter-receiver section 103a, 130a for receiving control or supervisory commands from other terminal devices, a decoding section 103b, 130b for decoding the control or supervisory commands received by the transmitter-receiver section 103a, 130a, a control signal generating section 103c, 130c for generating, based on the control commands decoded by the decoding section 103b, 130b, control signals indicative of appropriate control procedures suited to the control system of the corresponding power distribution device 107 connected therewith, a driving output section 103d, 130d for driving, based on the control signals thus generated, the corresponding power distribution device 107 connected therewith, an input section 103e, 130e for receiving data necessary for supervising the power distribution device 107, a supervisory information generating section 103f, 130f for generating, based on the data thus inputted to the input section 103e, 130e, concrete supervisory information required by other terminal devices, an alarm command generating section 103g, 130g for generating, based on the supervisory information thus generated by the supervisory information generating section 103f, 130f alarm commands which are to be inputted to the other terminal devices as required when there is a need for alarming, a control or supervisory command generating section 103h, 130h for generating concrete control or supervisory commands when there is a need for transmitting the alarm commands to the other terminal devices, and an encoding section 103i, 130i for encoding the information or commands from the supervisory information generating section 103f, 130f, the alarm command generating section 103g, 130g, and the control and supervisory command generating section 103h, 130h into appropriate forms necessary for signal transmission.

The system further includes an electric load 104, an electric power source 105, a main circuit 106 for supplying electric power from the electric power source 105 to the load 104, a power distribution device 107 in the form of an earth-leakage breaker interposed in the main circuit 106, and an operation section 108 for the power distribution device 107 in the form of an electrically operated switch connected with the driving output section 103d of the first terminal device 103 for opening and closing the earth-leakage breaker 107.

The earth-leakage breaker 107, which is a power distribution and protective equipment, comprises a switching and breaker section 107b operable to cut off or break the main circuit 106 so as to isolate the electric power source 105 from the load 104 when the load 104 is subjected to overloading, or when short circuiting or earth leakage takes place in the load 104 or the main circuit 106, and an earth-leakage sensing section 107c for sensing an earth leakage in the load 104 or the main circuit 106.

Also, provisions are made for an auxiliary contact (AX) 109 for sensing the open or closed mode or condition of the switching and breaker section 107b of the earth-leakage breaker 107, an alarm contact (AL) 110 for sensing an overcurrent cut-off operation mode, or a short-circuit cut-off operation mode, or an earth-leakage cut-off operation mode (i.e., called as trip) of the earth-leakage breaker 107, and an earth-leakage alarm contact (EAL) 111 for sensing an earth-leakage operation mode (i.e., called as earth-leakage trip) of the earth-leakage breaker 107. The auxiliary contact 109, the alarm contact 110 and the earth-leakage alarm contact 111 are all connected to the input section 103e of the first terminal device 103.

Also, the turn-on switch 140-1 and the turn-off switch 140-2 of FIG. 8 are connected with the input section 130e of the second terminal device 130. The first through fourth indicators 140-3, 140-4, 140-5 and 140-6 of FIG. 8 for indicating supervisory data are respectively connected with the driving output section 130d.

Figure 10:
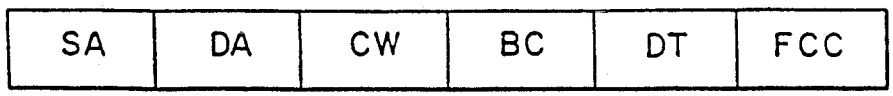
FIG. 10 is a schematic illustration showing an example of the structure of a transmission frame to be transmitted through a transmission path according to the present invention.

In the above embodiment, signal transmission between the first and second terminal devices 103, 130 is carried out by the use of a microcomputer. FIG. 10 illustrates an example of a frame structure required for such transmission. In this figure, the frame illustrated contains a self address (SA), a distant or opponent address (DA), a command (CW) for instructing or alarming according to the present invention, a data-number storage area (BC) for storing the numbers (e.g., 0~n) of the following data, data (DT) for the above instructing and alarming which are only used when needed, and a frame check code (FCC) for identifying the frame.

Figure 11:
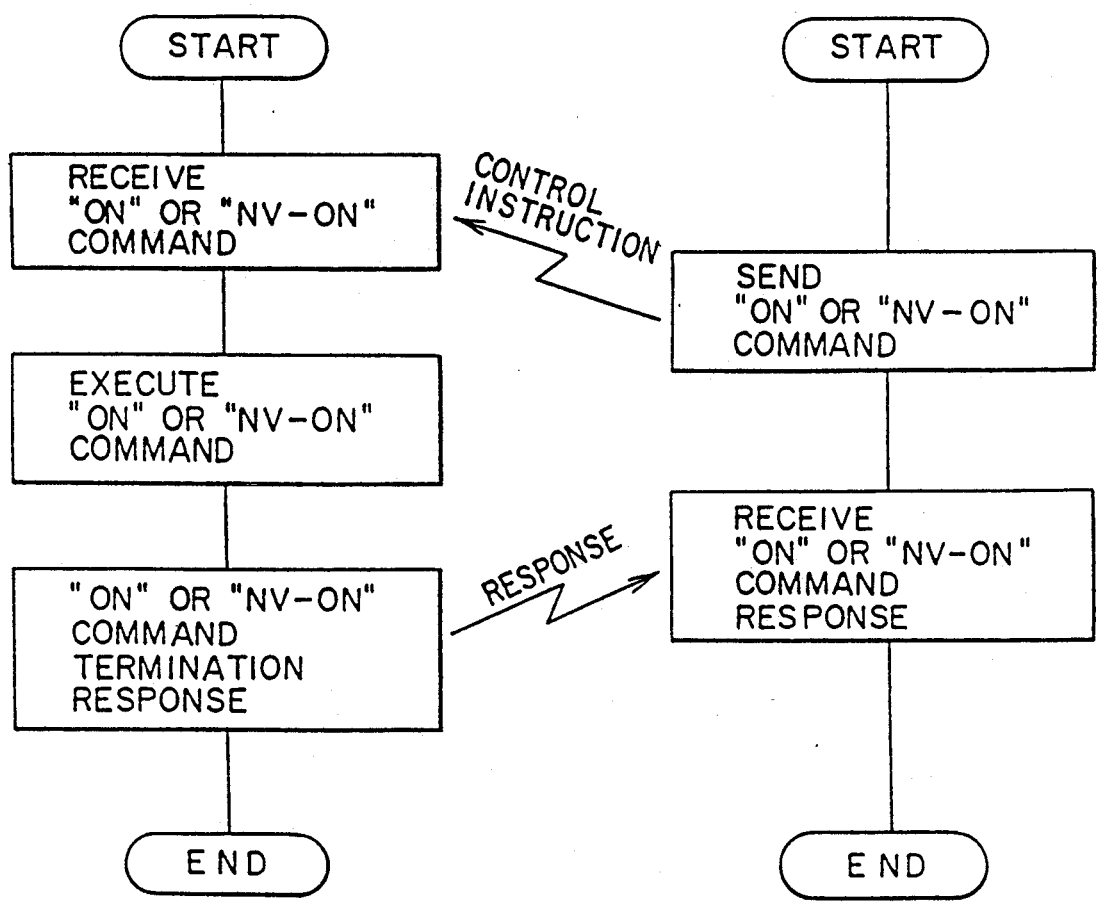
FIG. 11 is a flow chart showing the execution of a control instruction using a control command (i.e., an "ON" or "NV-ON" command) according to the present invention.

Now, one example of the control instructing operation of the system of FIGS. 8 and 9 as constructed above, in which a power distribution device in the form of an earth-leakage breaker (abbreviated as NV) is to be turned on, will be described using a control command which is conceptionally common to, or intrinsic to a corresponding one of, varying power distribution devices to be controlled while referring to FIG. 11. Specifically, when an operator pushes down the turn-on switch 140-1, the second terminal device 130 senses such a switch operation through the input section 130e so that the turn-on switch operation input is fed to the supervisory information generating section 130f via the input section 130e. The supervisory information generating section 130f generates a turn-on signal for turning on the earth-leakage breaker 107 based on a prescribed program stored therein. The turn-on signal thus generated is then fed to the control and supervisory command generating section 130h where a predetermined instruction command is generated which takes the form of an "ON" command conceptually common to power distribution devices 107 (only one of which is illustrated in FIGS. 8 and 9), or of an "NV-ON" command intrinsic to a corresponding power distribution device 107 which is, in this case, an earth-leakage breaker. The instruction command thus generated is then fed to the encoding section 130i where CW, BC and DT as shown in FIG. 10 are arranged in order. The thus properly arranged instruction command is sent to the transmitter-receiver section 130a which then produces a frame, as illustrated in FIG. 10, which is transmitted to the first terminal device 103 as an instruction command. In other words, as seen from FIG. 11, what is done by the second terminal device 130 is to transmit the "ON" command or the "NV-ON" command to the first terminal device 103.

Here, it is to be noted that the "ON" command is a conceptionally common control command which means conceptionally common control operations such as, for example, "closing a circuit", "starting an operation" and the like in cases where varying kinds of power distribution devices are to be controlled by the terminal devices 103, 130. In this embodiment, the "ON" command is utilized as a control command for closing the main circuit 106 through a circuit breaker which is, in this embodiment, the earth-leakage breaker 107.

Figure 12:
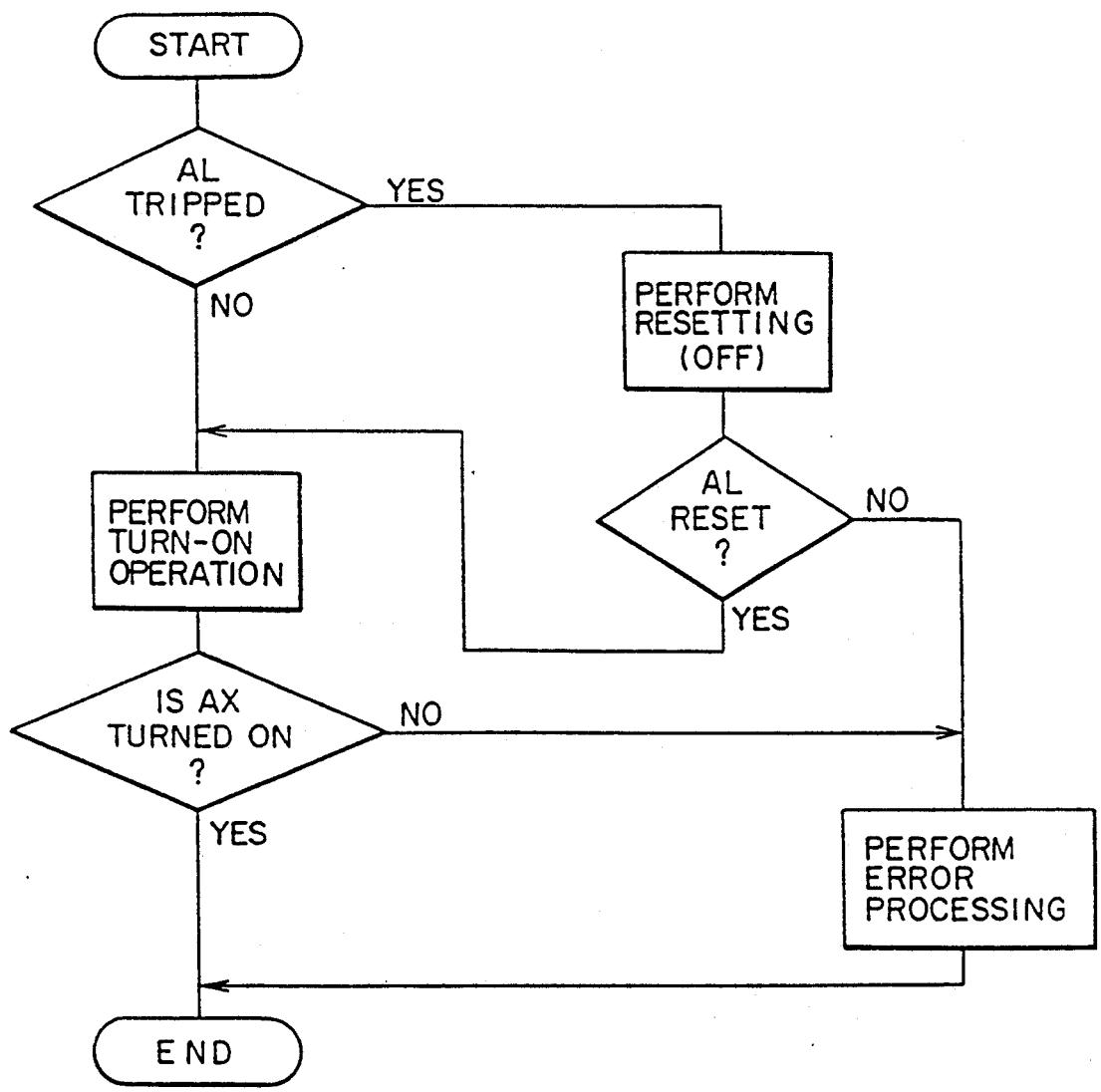
FIG. 12 is a flow chart showing an example of the process of generation of a control signal based on a control command (i.e., an "ON" or "NV-ON" command) at a terminal device according to the present invention.

The first terminal device 103 receives the "ON" or "NV-ON" command at the transmitter-receiver section 103a and there ascertains the transmission frame including SA, DA, CW, BC, DT and FCC as illustrated in FIG. 10. If it is determined by the transmitter-receiver section 103a that the DA in the frame is the same as the self station address of the first terminal device 103, the CW, BC and DT in the frame are passed to the decoding section 103b where it is further determined whether the CW is a control instruction command or a supervisory instruction command. In this embodiment, the decoding section 103b determines the "ON" or "NV-ON" command to be a control command, and puts the control signal generating section 103c in operation. Thus, based on the CW and DT, the control signal generating section 103c generates an optimum "ON" operation procedure suited to the power distribution devices 107 connected therewith (in case of the "ON" command) or an optimum "ON" operation procedure suited to the earth-leakage breaker 107 connected therewith (in case of the "NV-ON" command). With the optimum "ON" operation procedure thus generated, the power distribution devices 107 connected with the terminal device 103 are controlled through the driving output section 103d. An example of a procedure for executing the "ON" or "NV-ON" command in this case is illustrated in FIG. 12.

Figure 5:
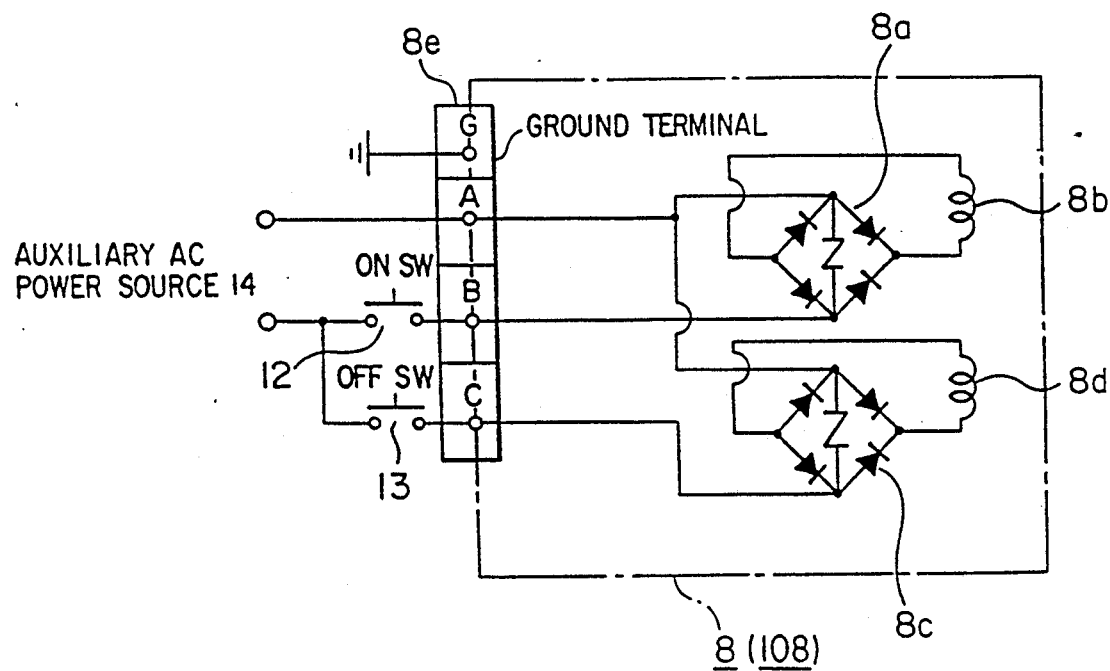
FIG. 5 is a circuit diagram showing an example of an electrically operated device for use with an earth-leakage breaker or a circuit breaker.
Figure 6:
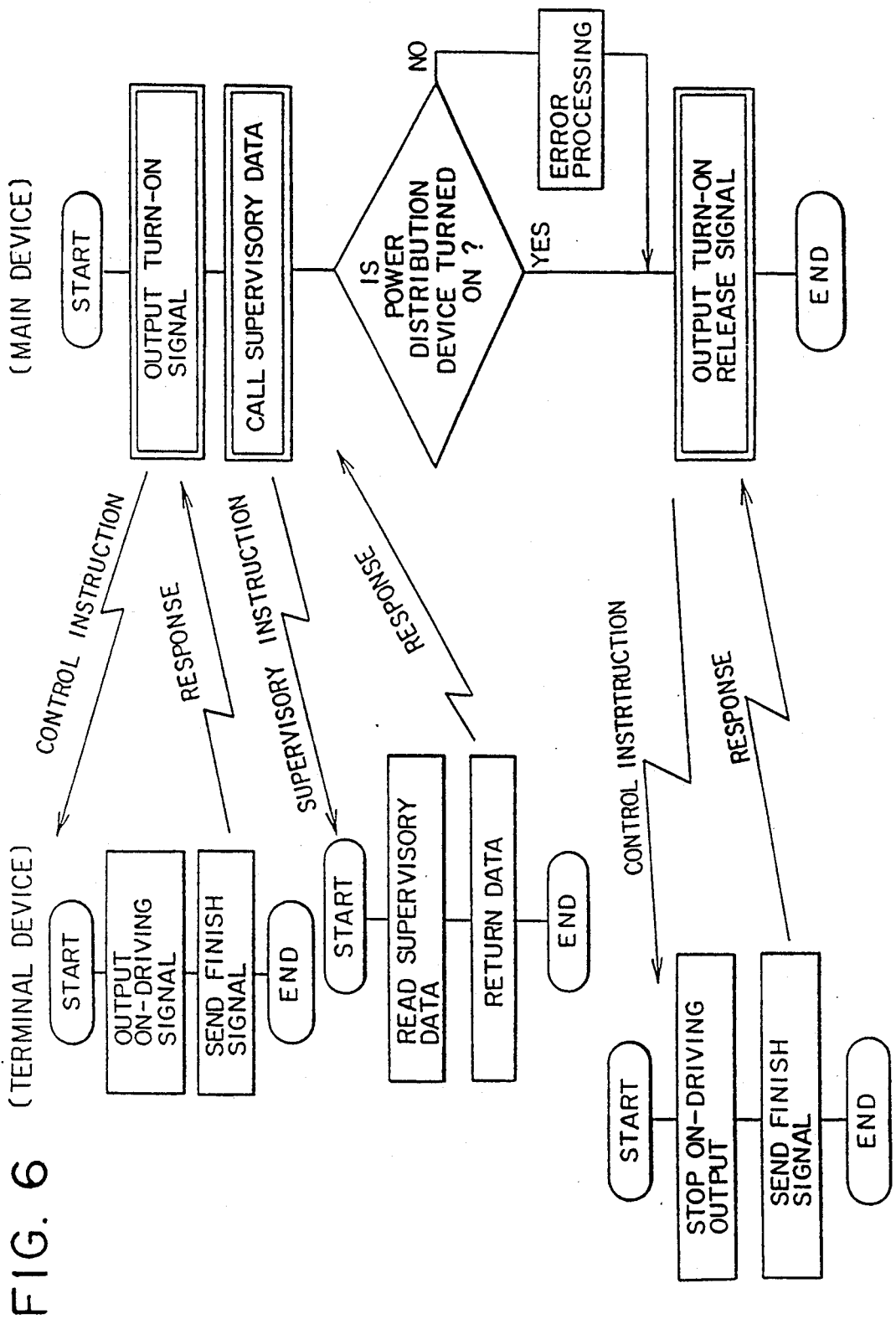
FIG. 6 is a flow chart showing the transmission of signals between a main device and a terminal device according to a conventional control and supervisory system.

First, from the supervisory data inputted to the input section 103e of the first terminal device 103, it is determined whether or not the earth-leakage breaker 107 connected with the terminal device 103 is tripped due to an overcurrent, a short circuit or an earth leakage by checking the operating condition of the alarm contact (AL) 110. If there is no trip of the earth-leakage breaker 107, the electrically operated device 108, which is the same as the one 8 shown in FIG. 5, is turned on through the action of the driving output section 103d. Specifically, in FIG. 5, the driving output section 103d acts to close the operation switch 12 of the electrically operated device 108 for a predetermined length of time. Thereafter, from the supervisory data fed to the input section 103e of the terminal device 103, the on/off condition of the earth-leakage breaker 107 is determined by checking the condition of the auxiliary contact (AX) 109. If it is determined that the turn-on operation of the earth-leakage breaker 107 has been finished, then the execution of the "ON" or "NV-ON" command is terminated. On the other hand, if it is determined that the earth-leakage breaker 107 is tripped, a reset processing is performed prior to the turning on of the electrically operated device 108 in order to relieve the tripped condition. Here, it is to be noted that such a reset processing on an earth-leakage breaker, a circuit breaker or the like, is generally performed in the same manner as in a turn-off operation, but in the case where a reset processing is independent of a turn-off operation, it is performed by an independent or separate resetting operation rather than a turn-off operation. Subsequently, the condition of the alarm contact (AL) 110 is checked again and if resetting has been finished, a turn-on operation as referred to above is carried out and the execution of the "ON" or "NV-ON" command is thus terminated. On the other hand, if resetting has not yet been finished, a prescribed error processing is performed and then the execution of the "ON" or "NV-ON" command is terminated.

Subsequently, the program returns to the processing shown in FIG. 11 where after the finishing of execution of the "ON" or "NV-ON" command, the terminal device 103 determines whether the "ON" or "NV-ON" command execution is a normal operation or an abnormal operation, and returns a response signal indicative of the result of such a determination to the second terminal device 130, thus terminating the execution of the "ON" or "NV-ON" command therein. The second terminal device 130 receives the response signal from the first terminal 103 at the transmitter-receiver section 130a and decodes it at the decoding section 130b. The response signal thus decoded is sent to the control signal generating section 130c which then controls the driving output section 130d so as to light the on-off indicator 140-3.

Figure 16:
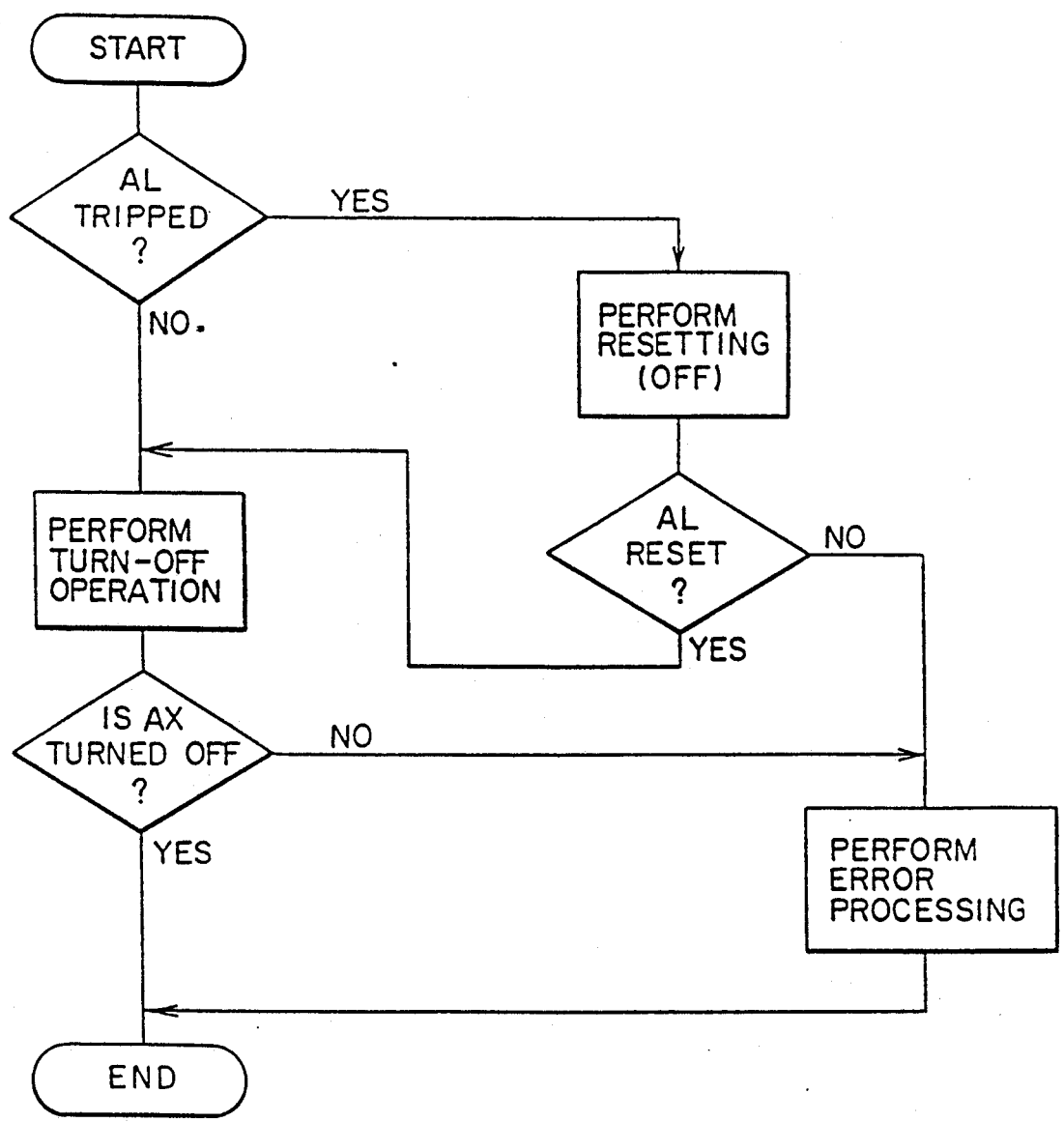
FIG. 16 is a flow chart showing an example of the generation of a control signal at a terminal device according to the present invention.

Similarly, a turn-off operation, which is conceptionally opposite to a turn-on operation, is carried out so as to perform such a processing as illustrated in FIG. 16. In this figure, it will be obvious to those skilled in the art that a resetting operation can be omitted in cases where resetting can be performed in the same procedure as in a turn-off operation, as described above.

Next, the operation of a supervisory instruction will be described with particular reference to FIG. 13 which illustrates an example of a procedure for executing a "supervisory" command, which is conceptionally common to the power distribution devices 107 connected with the terminal device 103, or a "NV-supervisory" command, which is intrinsic to a corresponding power distribution device 107 (which is, in this case, an earth-leakage breaker) connected with the terminal device 103.

First, the second terminal device 130 generates a "supervisory" or "NV-supervisory" command according to the same procedure as in the transmission of an "ON" or "NV-ON" command, and sends it from the transmitter-receiver section 130a to the transmitter-receiver section 103a of the terminal device 103.

The decoding section 103b of the first terminal device 103 decodes the "supervisory" or "NV-supervisory" command from the second terminal device 130, and determines whether or not CW in the command is a "supervisory" or "NV-supervisory" command code. If the answer is "YES", the supervisory information generating section 103f is operated to receive at the input section 103l supervisory data about the power distribution device 107 connected thereto, and generates, based on the supervisory data thus inputted, specific information as illustrated in FIG. 14.

Specifically, the supervisory information generating section 103f generates, based on three kinds of input information comprising auxiliary contact (AX) information, alarm contact (AL) information and earth-leakage alarm contact (EAL) information, seven kinds of supervisory information which comprises four normal operating modes including a breaker's "ON" condition, a breaker's "OFF" condition, an overcurrent/short-circuit tripped condition and an earth-leakage tripped condition, and three abnormal operating modes including a malfunction in the overcurrent/short-circuit tripping operation, a malfunction in the earth-leakage tripping operation, and other malfunctions. The above supervisory information is fed to the encoding section 103i where encoding such as, for example, generation of DT in the frame of FIG. 10 is performed based on the input supervisory information and the encoded information is then converted into a transmission frame which is in turn returned as a response signal to the second terminal device 130, thus finishing the execution of the "supervisory" or "NV-supervisory" command.

Subsequent to receipt of the transmission frame at the transmitter-receiver section 130a, the second terminal device 130 decodes it at the decoding section 130b and adds a CW and a DT thereto. The transmission frame is then passed to the control signal generating section 130c where a predetermined control signal suited to the "supervisory" or "NV-supervisory" command is generated so that the driving output section 130d is thereby controlled to light an appropriate one of the indicators 140-3, 140-4, 140-5 and 140-6. For example, if the "supervisory" or "NV-supervisory" command is indicative of the overcurrent and shortcircuit tripped condition as shown in FIG. 14, the indicator 140-4 is lighted by the control signal. In this manner, the operator can readily recognize the operating condition of the earth-leakage breaker 107 at the second terminal device 130.

In the following, the operation of the first terminal device 103 independent of the second terminal device 130, including an alarming of abnormalities or changes in operation of the power distribution device 107 connected therewith, as well as an instruction for controlling or supervising other terminal devices (not shown), will be described with particular reference to FIG. 13.

The input section 103e of the terminal device 103 reads supervisory data inputted thereto, and the supervisory information generating section 103f determines whether there is a change in the supervisory data. If there is a change in the data, the supervisory information generating section 103f generates supervisory information which is, for example, shown in FIG. 14, and sends it to the alarm instruction generating section 103g where it is determined whether or not the supervisory information thus generated should be transmitted to the second terminal device 130. If the answer is "YES", the supervisory information generating section 103g generates a CW for transmission, which is then sent to the encoding section 103i where an appropriate transmission frame containing CW, BC and DT is formed. This transmission frame is fed to the transmitter-receiver section 103a and it is, after having been added by SA, DA and FCC, transmitted to the transmitter-receiver section 130a of the second terminal device 130.

The transmitter-receiver section 130a receives the transmission frame and collates the DA in the frame with the self station address thereof. If there is coincidence therebetween, then the transmission frame is sent to the decoding section 130b where it is determined whether or not the information from the first terminal device 103 is an alarm instruction. If the answer is "YES", the information is further passed through the supervisory information generating section 130f to the alarm instruction generating section 130g where new alarm information about other terminal devices is produced as necessary according to a prescribed procedure stored therein. The new information thus produced is fed to the encoding section 130c and there encoded in an appropriate manner. The encoded information is then transmitted through the transmitter-receiver section 130a to the other terminal devices. In this connection, in cases where it is required that new control or supervisory information be produced by the decoding section 130b in accordance with a prescribed procedure stored therein, the alarm information is fed from the decoding section 130b through the supervisory information generating section 130f to the control and supervisory instruction generating section 130h where a new control or supervisory instruction is produced. The new control or supervisory instruction is fed to the encoding section 130c where it is encoded and then transmitted through the transmitter-receiver section 130a to other terminal devices.

Figure 15:
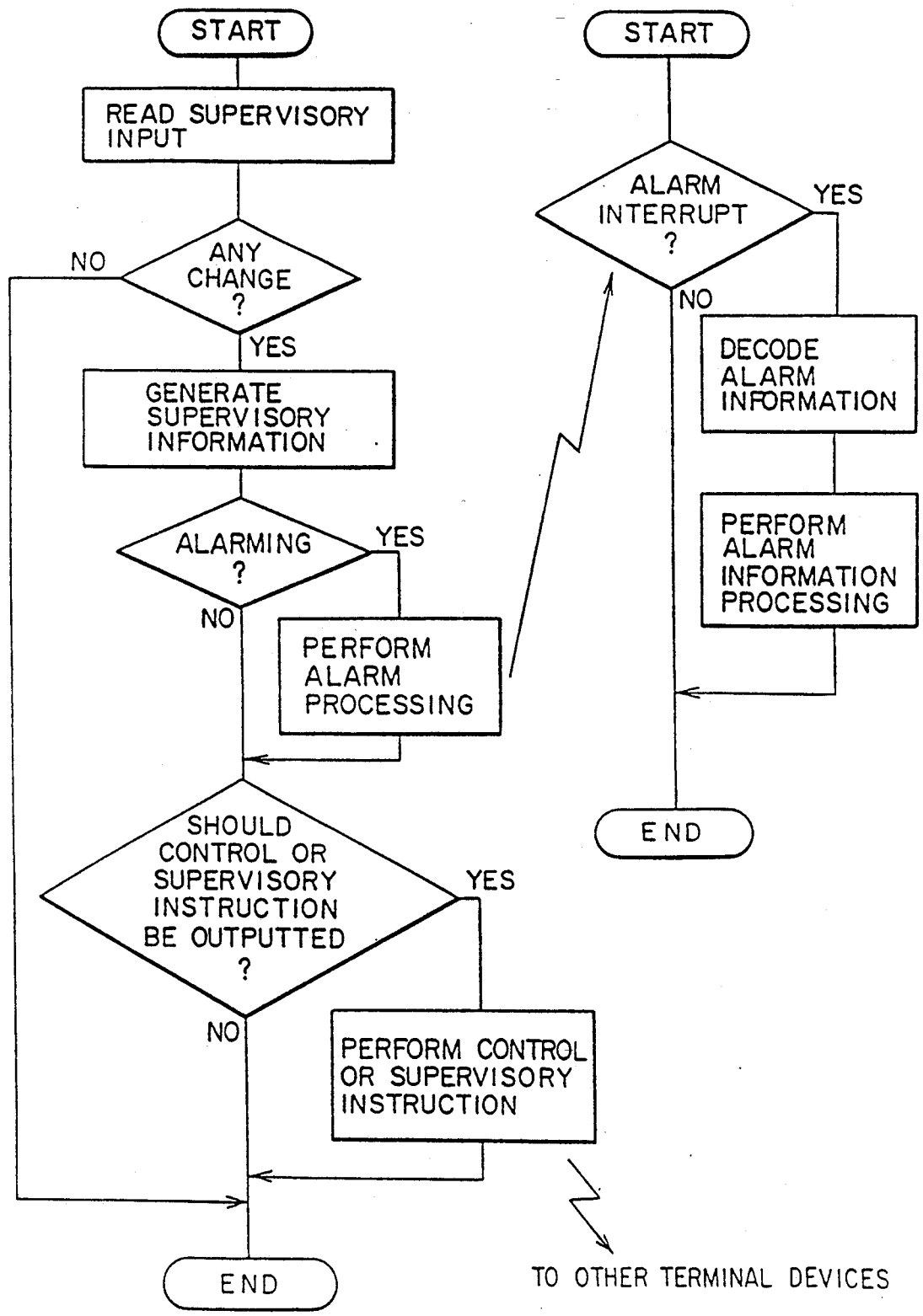
FIG. 15 is a flow chart showing the operations of an alarm instruction and a control and supervisory instruction from a terminal device according to the present invention.

Turning now to FIG. 15, the case in which a control or supervisory command is outputted directly from the specific terminal device 103 to other terminal devices (not shown) on the basis of the supervisory information generated in the specific terminal device 103 will be described. The supervisory information generated by the supervisory information generating section 103f of the specific terminal device 103 is fed to the control and supervisory command generating section 103h where a new control or supervisory command is produced. The control or supervisory command is then fed to the encoding section 103i where a CW, BC and DT are generated and added thereto. The command containing the CW, BC and DT is further fed to the transmitter-receiver section 103a and then sent therefrom to other terminal devices. Here, it will be understood to those skilled in the art that the transmission system of the present invention is not limited to the specific type of transmission system as described above, but any type of transmission system can be utilized for the purposes of the invention. Thus, for example, contact signals each corresponding to a control or supervisory command may be transmitted to terminal devices, or various types of multiplex transmission techniques such as those using a private line or a power line with the application of a microcomputer may also be employed. Specifically, each of the terminal devices is constructed such that it can transmit, by itself, a control, supervisory or alarm instruction to predetermined ones of other terminal devices based on supervisory information such as changes in the operating conditions of power distribution devices connected therewith or with other terminal devices, and thus it serves a central control or supervisory device or a main device during such transmission or until the time when the execution of such an instruction has been finished. On the other hand, when each terminal device receives a control, supervisory or alarm instruction from one of other terminal devices, it can also act as an intrinsic terminal device while regarding the transmitter as a central control and supervisory device.

Although the above embodiment as illustrated in FIG. 9 shows a basic processing flow for transmitting and responding to a control or supervisory command and an alarm command, another embodiment will be described in the following.

Figure 17:
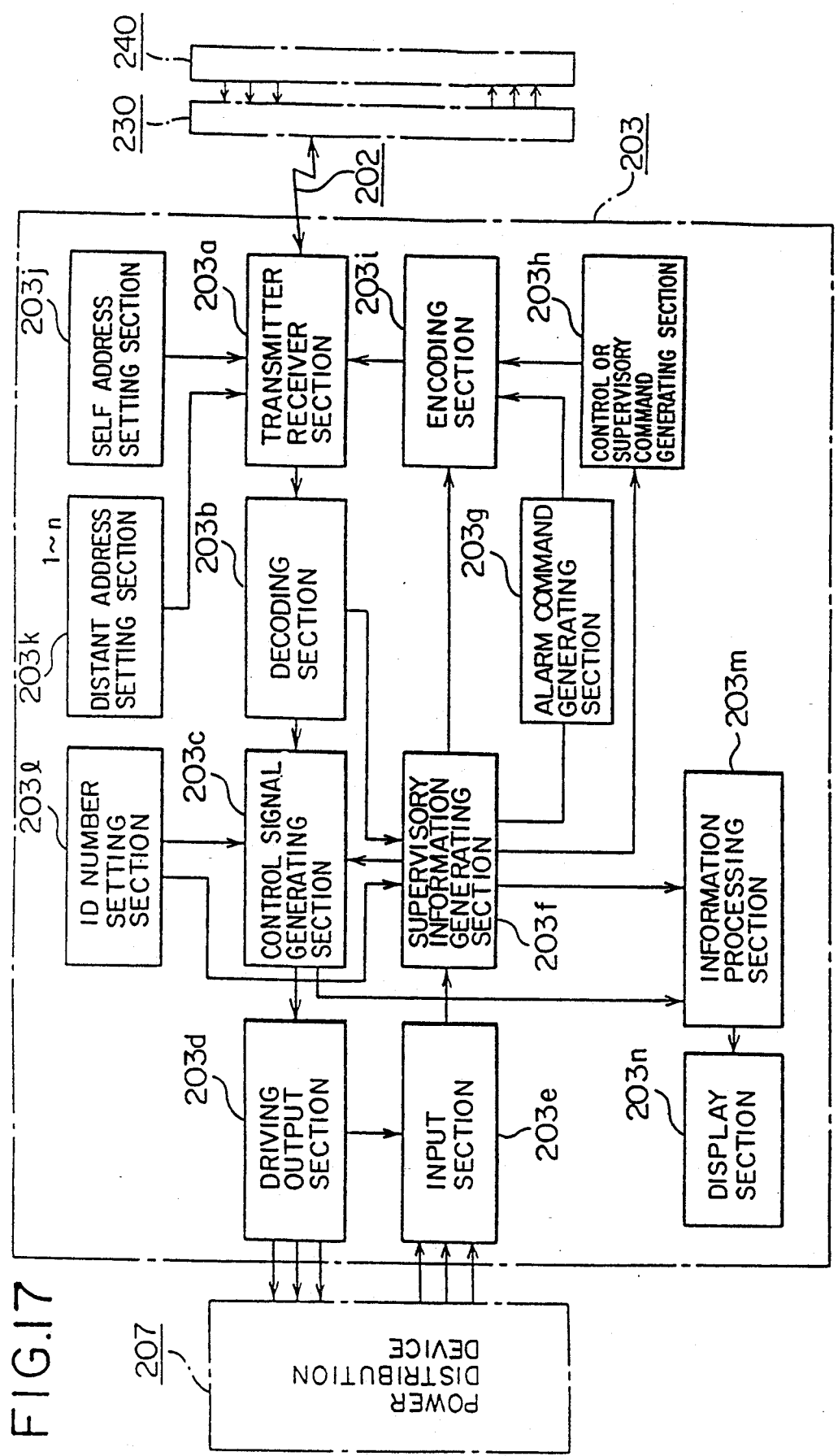
FIG. 17 is a functional block diagram showing a control and supervisory system for power distribution equipment according to another embodiment of the present invention.

FIG. 17 shows another embodiment in which a first terminal device 203 comprises, in addition to component sections 203a through 203i which are the same as those 103a through 103i of FIGS. 8 and 9, a self address setting section 203j, a distant or opponent address setting section 203k, an ID number setting section 203l for setting specific ID numbers for each kind of power distribution device 207 (only one is illustrated) connected therewith (e.g., setting the ID Nos. of a circuit breaker as 01, an earth-leakage breaker as 02, an electromagnetic switch as 03, and the like), an information processing section 203m mounted on a surface of the first terminal device 203 itself for processing information about the generation of control signals, supervisory information about the power distribution devices 207 connected with the first terminal device 203 (e.g., conditions of "ON", "OFF", tripping, malfunctions and the like of the power distribution devices 207), and information about signal transmitting and receiving conditions, and a display section 203n also mounted on a surface of the first terminal device 203 itself for displaying the information thus processed.

In this case, the provision of the self address setting section 203j and the distant address setting section 203k serves to give substantial flexibly to the system in coping with the problems of an extension, revision and the like thereof, and of the addition of control and supervisory systems as required. Also, if a plurality (e.g., 1~n) of distant address setting sections 203k are provided, it is possible to send control or supervisory commands or alarm commands to a plurality of terminal devices. Further, a control procedure such as an on-off control procedure, a control signal generating procedure, a supervisory information generating procedure, and the like, which are different for respective power distribution devices, may be stored in the control signal generating section 203c and the supervisory information generating section 203f, so that a specific control signal generating procedure or a specific supervisory information generating procedure can be selected in accordance with a particular ID No. set by the ID number setting section 203l so as to supervise or control a power distribution device 207 corresponding to the set ID No. With this construction, only one kind of terminal device 203 is needed to control and supervise a plurality of kinds of power distribution devices 207. The display section 203n enables an operator to directly visually observe the operating conditions of the respective power distribution devices 207 and the transmission conditions between the terminal device 203 and the corresponding power distribution devices 207.

Figure 18:
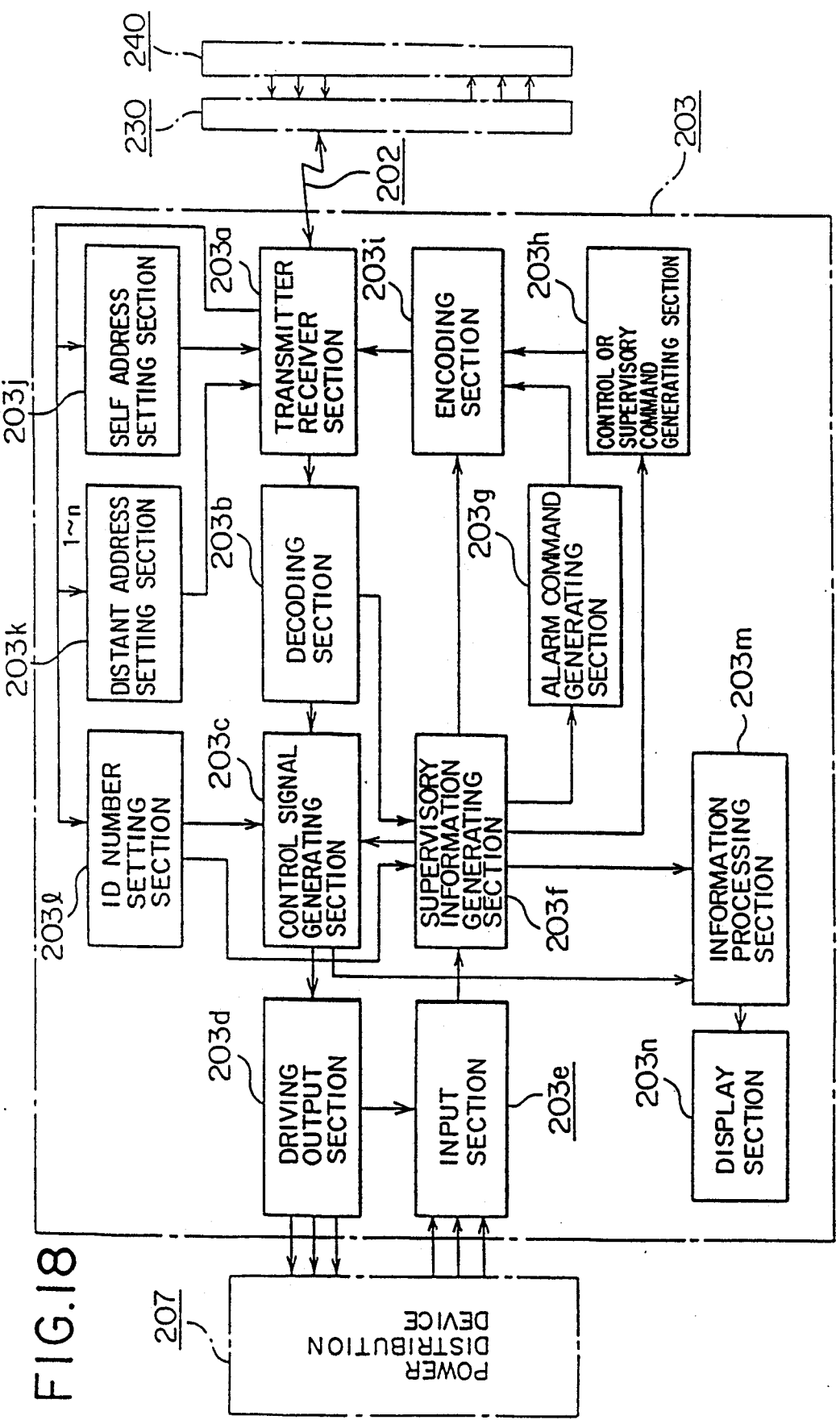
FIG. 18 is a view similar to FIG. 17, but showing a further embodiment of the present invention.

FIG. 18 shows a further embodment which is similar to the embodiment of FIG. 17 except for the fact that the terminal device 203 is constructed in such a manner that the values as set by the self address setting section 203j, the distant address setting section 203k and the ID number setting section 203l can be downloaded to and stored in the respective sections 203j, 203k and 203l through the transmitter-receiver section 203a by an instruction from a prescribed one of the other terminal devices. In this case, the writing of such an instruction into the respective sections 203j, 203k and 203l can be carried out at the time of initialization of the system or during the operation thereof. In this embodiment, since the respective set values for these sections 203j, 203k and 203l can be changed by an instruction from the prescribed terminal device, if the kind or arrangement of the power distribution devices 207 is changed, the structure of the system can be readily adapted to such a change by simply changing the instruction from the prescribed terminal device into an appropriate one.

Figure 19:
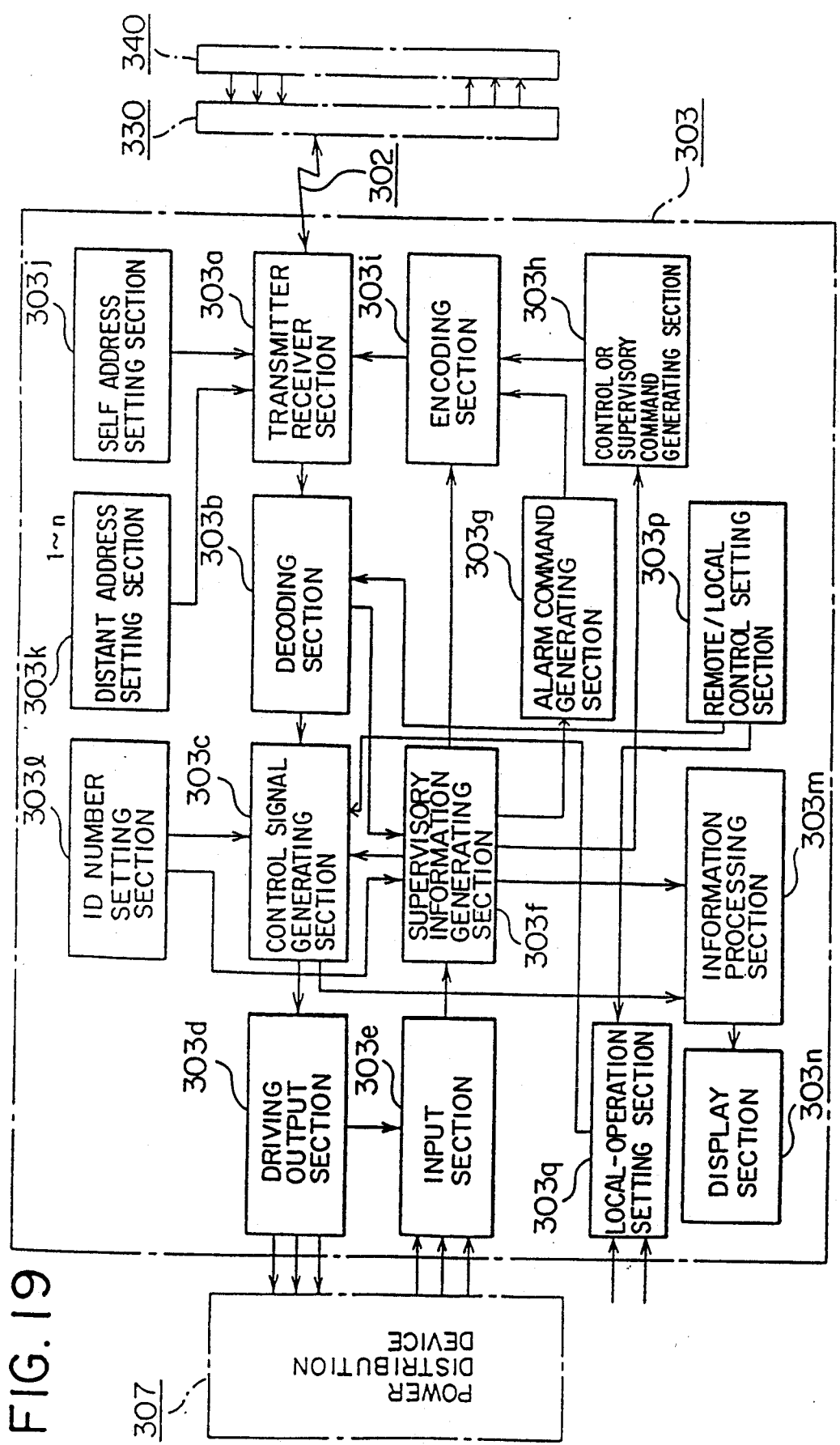
FIG. 19 is a view similar to FIG. 17, but showing a yet further embodiment of the present invention.

FIG. 19 shows a yet further embodiment which is similar to the embodiment of FIG. 17 except for the fact that a first terminal device 303 comprises, in addition to component sections 303a through 303n which are the same as those 103a through 103n of FIG. 17, a remote/local control setting section 303p for setting a remote control mode and a local control mode, and a local-operation input section 303q for receiving an external operation signal. In this embodiment, when the remote/local control setting section 303p sets the remote control mode, it functions to disable an external operation signal inputted to the local-operation input section 303q and allow the operation of the decoding section 303b, whereas when setting the local control mode, the remote/local control setting section 303p allows an external operation signal to be inputted to the local-operation input section 303q and disables the operation of the decoding section 303b. Although in this embodiment, the remote/local control setting section 303p generates no signals for allowing or disabling the operations of the alarm information generating section 303g and the control and supervisory instruction generating section 303h, the system may be so constructed as to generate and supply such signals to them. According to this embodiment, with the provision of the remote/local control setting section 303p in the terminal device 303, the power distribution devices 307 connected therewith can be separated or disconnected from the network of the control and supervisory system for independent operation thereof. Accordingly, upon maintenance, it is possible for an inspector to separate or disconnect any of the power distribution devices 307 from the terminal device 303, and then readily operate and inspect them in an efficient manner independent of the rest of the system. In addition, there is no possibility of the thus separated power distribution devices 307 being operated by an erroneous instruction from other terminal devices. Further, the system network as a whole can be held alive or in operation during the maintenance of any one(s) of the power distribution devices 303 which are isolated therefrom, thus making it possible to minimize the number of the system components which are to be stopped for this purpose. This leads to a substantial improvement in the operational efficiency of the overall system. Furthermore, during the local control mode, an external operation signal, which is inputted form the outside to the local operation input section 303q of the terminal device 303, may be a macro or simple signal since a prescribed control procedure stored in the control signal generating section 303c of the terminal device 303 can be used for the external operation signal. The use of such a macro or simple external signal serves to simplify the structure of the terminal device 303 and make it easy to handle.

Figure 20:
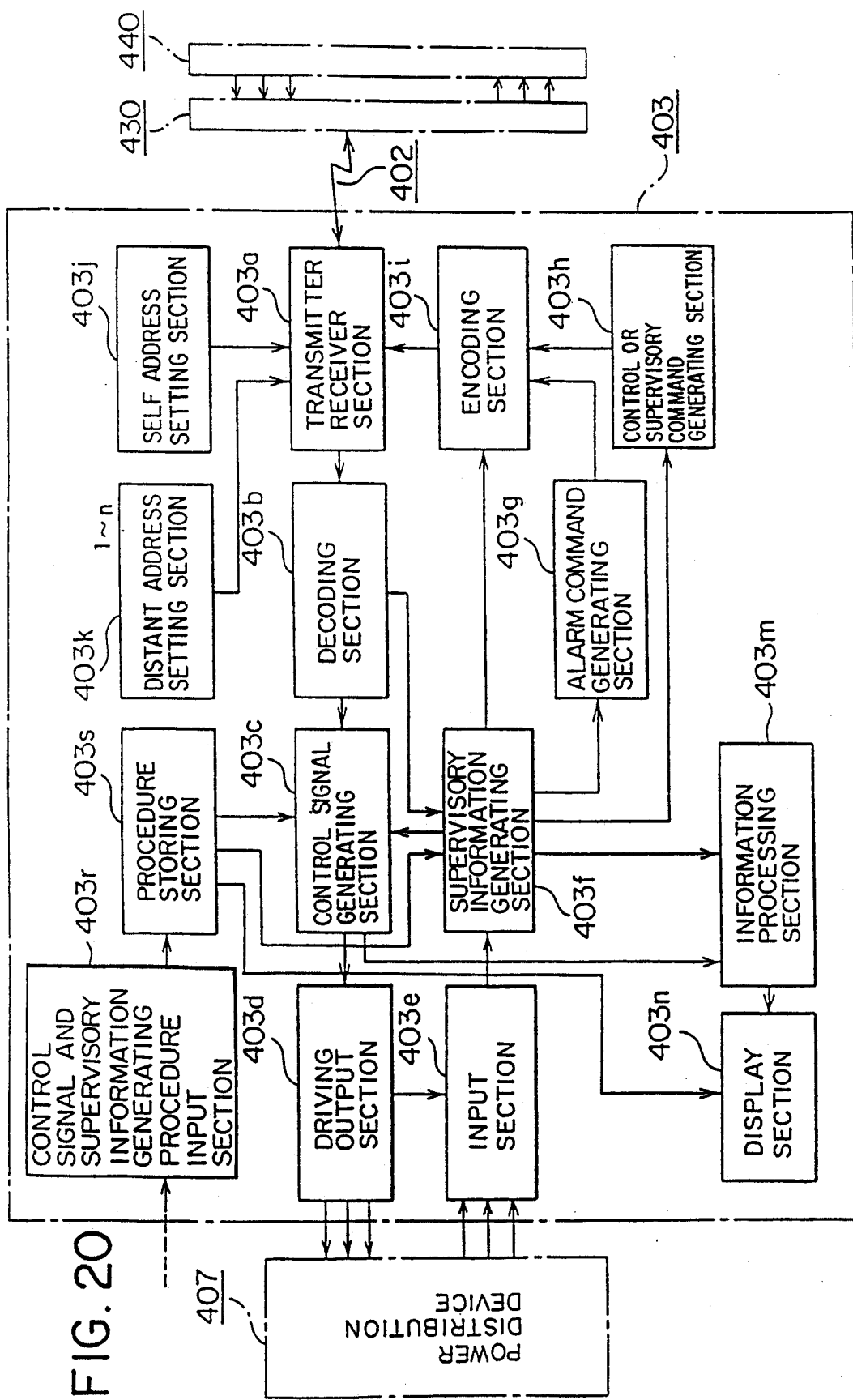
FIG. 20 is a view similar to FIG. 17, but showing a further embodiment of the present invention.

FIG. 20 shows a further embodiment in which a control signal generating procedure or a supervisory information generating procedure for controlling or supervising various kinds of power distribution devices connected with a terminal device can be programmed in the terminal device by an instruction from the outside. This embodiment is similar to the embodiment of FIG. 17 excepting that the ID number setting section 103l of the first terminal device 103 of FIG. 17 is replaced by a procedure input section 403r to which a procedure for producing a control signal or supervisory information can be inputted from the outside, and a procedure storing section 403s for storing various procedures inputted to the procedure input section 403r and sending, as required, the respective procedures to the control signal generating section 403c and the supervisory information generating section 403f where appropriate ones of the procedures thus sent are selected and executed by a control or supervisory command transmitted from other terminal devices. The procedures stored in the procedure storing section 403s are also sent to the display section 403n where they can be displayed and visually acertained by an operator at the terminal device side. According to this embodiment, an appropriate control signal generating procedure or an appropriate supervisory information generating procedure for the power distribution devices 407 connected to the terminal device 403 can be inputted to the terminal device 403 from the outside so that the terminal device 403 itself has a high degree of freedom in operation. Therefore, should the power distribution devices 407 connected with the terminal device 403 be changed and replaced by new ones, this embodiment can perform optimum control or supervisory operations on the new power distribution devices changed without requiring any change in the system structure.

Figure 21:
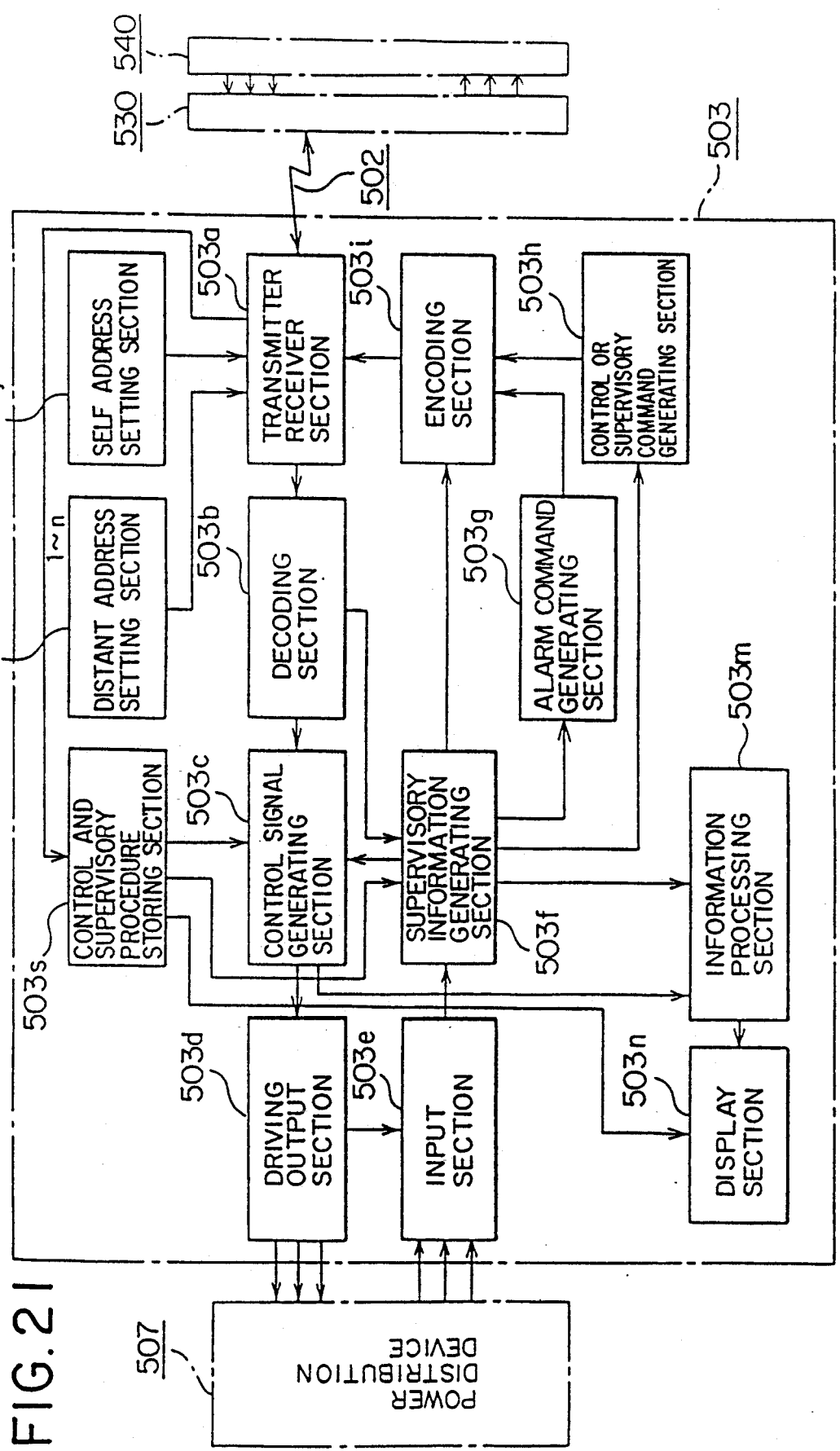
FIG. 21 is a view similar to FIG. 17, but showing a further embodiment of the present invention.

FIG. 21 shows a modification of the embodiment of FIG. 20 which is similar to the FIG. 20 embodiment except for the fact that a first terminal device 503 is constructed in such a manner that a control signal generating procedure and a supervisory information generating procedure as used in the FIG. 20 embodiment can be downloaded from a prescribed one of other terminal devices into the specific terminal device 503. Specifically, such procedures are inputted to a transmitter-receiver section 503a of the terminal device 503 from the other prescribed terminal device 501 and passed therefrom to a control and supervisory procedure storing section 503s for storage therein. In accordance with a control command or a supervisory command which is inputted to the transmitter-receiver section 503a from the main device 501, appropriate control or supervisory procedures are sent from the control and supervisory procedure storing section 503s to a control signal generating section 503c and a supervisory information generating section 503f where optimum control signals or information are generated. These procedures are formed in the same manner as in the embodiment of FIG. 20 so that they can be visually ascertained through a display section 503n at the terminal device side. In this case, the downloading of the above control and supervisory procedures can generally be carried out at the time of initializing the system, but such optimum control or supervisory procedures can instead be sent from the other prescribed terminal device to the terminal device 503 simultaneously with the execution of a command, i.e., at the same time when a command is transmitted from the other prescribed terminal device to the terminal device 503. Thus, in this modification, optimum procedures can be sent from a prescribed one (e.g., a second terminal device 530) of other terminal devices to the first terminal device 503 in accordance with the kinds of the power distribution devices 507 employed, eliminating the need of changing or inputting the respective programs at the terminal device side, as carried out in the FIG. 20 embodiment.

Figure 22:
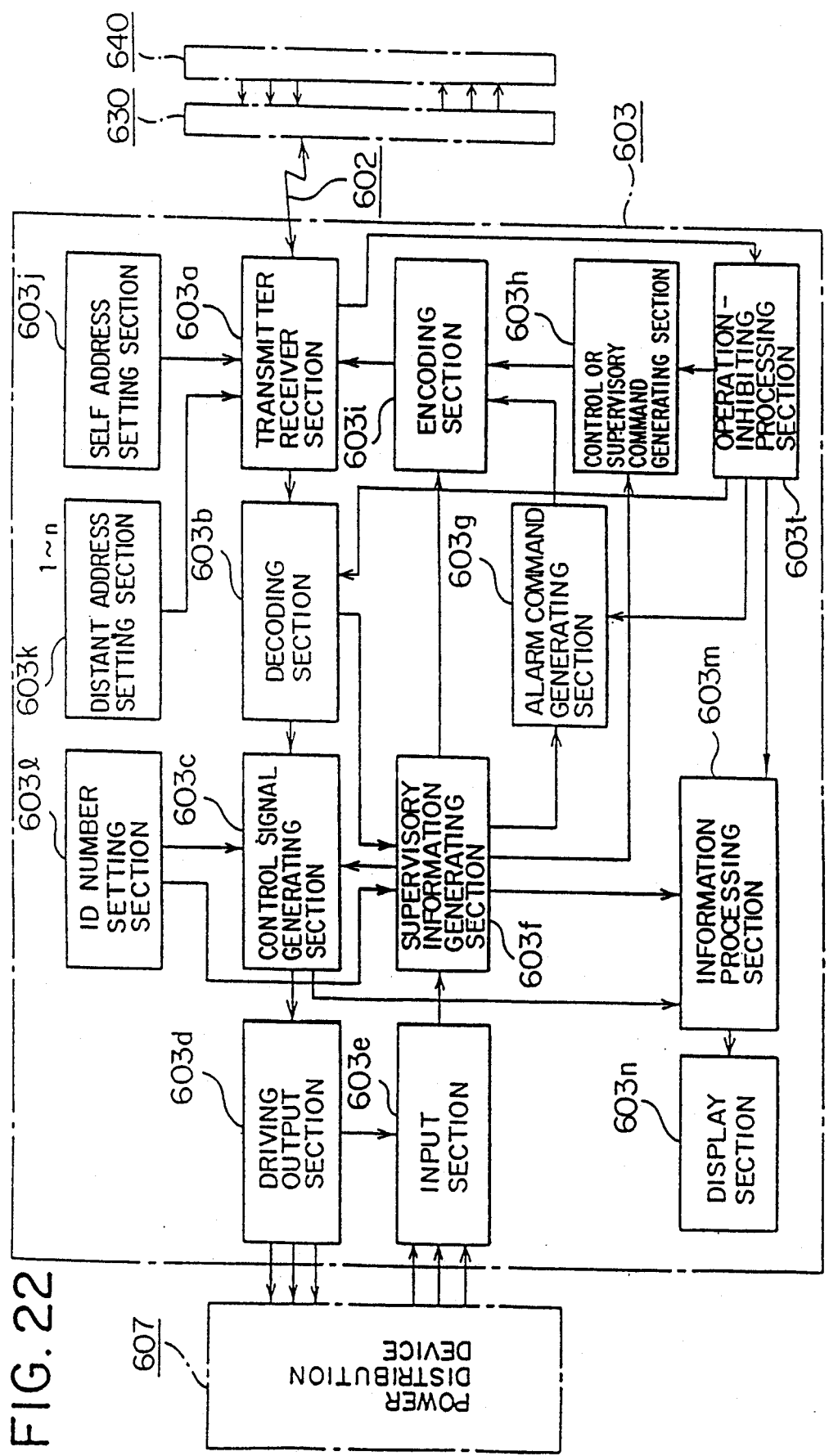
FIG. 22 is a view similar to FIG. 17, but showing a further embodiment of the present invention.

FIG. 22 shows a further embodiment which is different from the embodiment of FIG. 17 only in the feature that a terminal device 603 is further provided with an operation-inhibiting processing section 603t for inhibiting the operations of a decoding section 603b, an alarm information generating section 603g and a control and supervisory instruction generating section 603h. In this embodiment, a prescribed one (e.g., a second terminal device 630) of other terminal devices sends an inhibition instruction to the operation-inhibiting processing section 603t through a transmitter-receiver section 603a so that the operation-inhibiting processing section 603t operates to inhibit all or part of the operations of the above sections 603b, 603g and 603h. Also, the operation-inhibiting processing section 603t is connected through an information processing section 603m to a display or indicator section 603n for indicating inhibition conditions of the sections 603b, 603g and 603h. As constructed above, the generation and transmission of alarm, control and supervisory instructions from an inappropriate terminal device or devices as well as the operations thereof can be inhibited so that any unnecessary signal transmission between various component portions of the entire system is eliminated, enhancing the efficiency of utilization of transmission lines employed.

Figure 23:
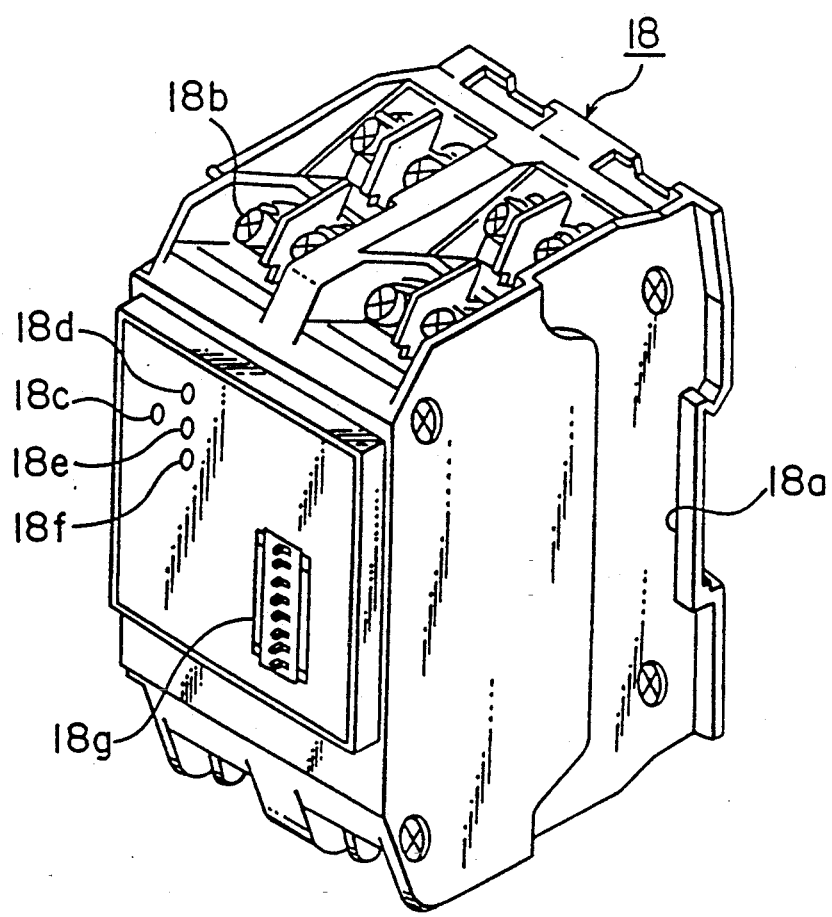
FIG. 23 is a perspective view showing the external appearance of a concrete example of a terminal control and supervisory device according to the present invention.

FIG. 23 illustrates an example of a terminal device for an earth-leakage breaker in accordance with the present invention. The terminal device 18 illustrated comprises a body 18a, connector terminals 18b for signal transmission and reception as well as for outputting driving signals and inputting control and supervisory signals, an LED 18c for indicating transmission conditions, an on-off condition indicating LED 18d for indicating on-off conditions of earth-leakage breakers connected the terminal device 18, an overcurrent and shortcircuit trip condition indicating LED 18e for indicating the operating condition of the overcurrent and shortcircuit trip, an earth-leakage trip condition indicating LED 18f for indicating the operating condition of the earth-leakage breaker, and an address setting switch 18g for setting the self address of the terminal device 18 and distant addresses of other terminal devices (not shown).

As described in the foregoing, according to the present invention, no central control and supervisory unit (main device) is required for constructing a control and supervisory system for power distribution devices. To this end, each of terminal devices includes a control signal generating section and a supervisory information generating section for generating control procedures and supervisory information suited to control and supervise power distribution devices connected therewith. With this construction, each terminal device can be controlled and supervised by a macro (i.e., relatively rough) control and supervisory instruction from a prescribed one of other terminal devices, the instruction being conceptionally common to, or intrinsic to a corresponding one of, the power distribution devices. As a result, programs for the control and supervisory procedures executed by the other prescribed terminal device is substantially simplified. Also, in the control and supervision of various power distribution devices, conceptionally common commands can be utilized for controlling and supervising the varying kinds of power distribution devices. This serves to further simplify the control programs. Further, various kinds of power distribution devices can be controlled and supervised in a simple and easy manner without requiring any substantial and full knowledge of the complicated and troublesome control and supervisory procedures for the power distribution devices. Moreover, for the purpose of the transmission of signals between various component devices, there is no need for sending appropriate control and supervisory procedures from one of terminal devices to the other terminal devices, so that the efficiency of utilization of signal transmission lines can be greatly improved, enhancing the program processing capacity of the terminal device which is the sender of the control and supervisory procedures. Therefore, the control and supervisory programs can be simplified and it is possible to provide a control and supervisory system for power distribution devices of high quality at a relatively low cost. Furthermore, in the event that there is a change or abnormality in operation of the respective power distribution devices, the entire system is constructed such that each terminal device can directly communicate, through the transmission of alarm commands, supervisory information about a change or abnormality in the corresponding power distribution device to the other terminal devices at appropriate instants. Likewise, the terminal devices themselves can generate appropriate control and supervisory commands as necessary independently of the main device, and send such commands to other terminal devices. Thus, the terminal devices do not have to wait for a unilateral control and supervisory procedure such as polling supplied from a prescribed terminal device, thereby reducing a time lag in operation and improving response thereof.

What is claimed is:

1. A control and supervisory system for power distribution equipment including a plurality of terminal control devices each controlling a corresponding power distribution device connected therewith, each of said terminal control devices comprising:

control instruction means in each terminal device operable to generate and output a control command for controlling said plurality of power distribution devices, the control command being conceptually common to the power distribution devices; and control means operable to receive the control command from said control instruction means for generating a control signal suited to control a corresponding one of said power distribution devices, and outputting it to said corresponding power distribution device.

2. A control and supervisory system for power distribution equipment as claimed in claim 1, wherein each of said terminal control devices includes alarm instruction means for outputting an alarm command to the other terminal control devices.

3. A control and supervisory system for power distribution equipment as claimed in claim 2, wherein each of said terminal control devices outputs a control command from its control instruction means when it receives an alarm command from one of the other terminal control devices.

4. A control and supervisory system for power distribution equipment as claimed in claim 3, wherein said alarm command is conceptionally common to said power distribution devices.

5. A control and supervisory system for power distribution equipment including a plurality of terminal control devices connected therewith, each of said terminal control devices comprising:

supervisory instruction means in each terminal control device operable to output a supervisory command for supervisory command for supervising a plurality of power distribution devices, the supervisory command being conceptually common to the power distribution devices; and supervisory means operable to receive the supervisory command from said supervisory instruction means for generating a supervisory signal suited to supervise a corresponding one of the power distribution devices, and outputting the supervisory signal to a corresponding power distribution device.

6. A control and supervisory system for power distribution equipment as claimed in claim 5, wherein each of said terminal supervisory devices includes alarm instruction means for outputting an alarm command to the other terminal supervisory devices.

7. A control and supervisory system for power distribution equipment as claimed in claim 5, wherein each of said terminal supervisory devices outputs a supervisory command at its supervisory instruction means when it receives an alarm command from one of the other terminal supervisory devices.

8. A control and supervisory system for power distribution equipment as claimed in claim 7, wherein said alarm command is conceptionally common to said power distribution devices.

9. A control and supervisory system for power distribution equipment including a plurality of terminal control devices each controlling a corresponding power distribution device connected therewith, each of said terminal control devices comprising:

control instruction means in each terminal control device operable to output a control command for controlling a plurality of power distribution devices, the control command being intrinsic to a corresponding one of said power distribution devices; and terminal control means operable to receive the control command from said control instruction means for generating a control signal suited to control a corresponding one of the power distribution devices, and outputting the control signal to a corresponding power distribution device.

10. A control and supervisory system for power distribution equipment as claimed in claim 9, wherein each of said terminal control devices includes alarm instruction means for outputting an alarm command to the other terminal control devices.

11. A control and supervisory system for power distribution equipment as claimed in claim 10, wherein each of said terminal control devices outputs a control command from its control instruction means when it receives an alarm command from one of the other terminal control devices.

12. A control and supervisory system for power distribution equipment as claimed in claim 11, wherein said alarm command is intrinsic to a corresponding one of said power distribution devices.

13. A control and supervisory system for power distribution equipment including a plurality of terminal supervisory devices each supervising a corresponding power distribution device connected therewith each of said terminal supervisory devices comprising:

supervisory instruction means in each terminal supervisory device operable to output a supervisory command for supervising a plurality of power distribution devices, the supervisory command being intrinsic to a corresponding one of said power distribution devices and supervisory means operable to receive the supervisory command from said supervisory instruction means for generating a supervisory signal suited to supervise a corresponding one of said power distribution devices, and outputting it to said corresponding power distribution device.

14. A control and supervisory system for power distribution equipment as claimed in claim 13, wherein each of said terminal supervisory devices includes alarm instruction means for outputting an alarm command to the other terminal supervisory devices.

15. A control and supervisory system for power distribution equipment as claimed in claim 14, wherein each of said terminal supervisory devices outputs a supervisory command from its supervisory instruction means when it receives an alarm command from one of the other terminal supervisory devices.

16. A control and supervisory system for power distribution equipment as claimed in claim 15, wherein said alarm command is intrinsic to a corresponding one of said power distribution devices.

* * * * *